(12) United States Patent
Takemoto et al.

(10) Patent No.: US 8,084,911 B2
(45) Date of Patent: Dec. 27, 2011

(54) MOTOR

(75) Inventors: Yoshiaki Takemoto, Toyohashi (JP);
Seiya Yokoyama, Toyohashi (JP); Yoji Yamada, Hamamatsu (JP); Shigemasa Kato, Toyohashi (JP); Yoko Tateishi, Kosai (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 315 days.

(21) Appl. No.: 12/580,118

(22) Filed: Oct. 15, 2009

(65) Prior Publication Data

US 2010/0133939 A1 Jun. 3, 2010

(30) Foreign Application Priority Data

| Oct. 16, 2008 | (JP) | 2008-267752 |
| Dec. 11, 2008 | (JP) | 2008-315198 |
| Feb. 10, 2009 | (JP) | 2009-028915 |
| Apr. 20, 2009 | (JP) | 2009-102031 |
| Apr. 28, 2009 | (JP) | 2009-110141 |

(51) Int. Cl.
*H02K 1/22* (2006.01)

(52) U.S. Cl. ............... 310/156.25; 310/156.07

(58) Field of Classification Search ............ 310/156.07, 310/156.15, 156.25, 156.33, 156.36, 156.37, 310/156.43, 156.48
See application file for complete search history.

(56) References Cited

U.S. PATENT DOCUMENTS

| 4,308,479 | A | * | 12/1981 | Richter | 310/156.07 |
| 4,656,379 | A | * | 4/1987 | McCarty | 310/181 |
| 6,081,053 | A | * | 6/2000 | Maegawa et al. | 310/49.39 |
| 7,969,056 | B2 | * | 6/2011 | Mizutani et al. | 310/156.07 |
| 2004/0021390 | A1 | * | 2/2004 | Kim et al. | 310/191 |
| 2010/0133939 | A1 | * | 6/2010 | Takemoto et al. | 310/156.43 |

FOREIGN PATENT DOCUMENTS

| JP | 2008-125203 | 5/2008 |
| JP | 2008-141803 | 6/2008 |

* cited by examiner

*Primary Examiner* — Dang D Le
(74) *Attorney, Agent, or Firm* — Duane Morris LLP; J. Rodman Steele, Jr.; Gregory M. Lefkowitz

(57) ABSTRACT

A motor including a stator and a rotor is disclosed. The rotor includes a first unit and a second unit. The first unit includes an N-pole first magnet and an S-pole second magnet. The first and the second magnets are alternately arranged along a circumferential direction of the rotor at equal angular intervals to form magnetic pole portions. The second unit includes an N-pole or S-pole third magnet and a salient pole arranged in the rotor core. The salient pole functions as a magnetic pole that differs from the third magnet. The third magnet and the salient pole are alternately arranged along the circumferential direction of the rotor to form magnetic pole portions. The number of magnetic pole portions of the second unit is the same as the number of magnetic pole portions of the first unit. The third magnet and the magnet of the first unit having the same pole as the third magnet are aligned in the axial direction of the rotor.

25 Claims, 20 Drawing Sheets

US 8,084,911 B2

MOTOR

BACKGROUND OF THE INVENTION

The present invention relates to a motor including a rotor partially having a consequent pole structure.

Various types of rotors may be used as the rotor for a motor. Japanese Laid-Open Patent Publication No. 2008-125203 in FIG. 5 shows a rotor including a magnetic pole portion formed only by a magnetic pole of a magnet. In the publication, FIG. 8 shows a rotor including a magnetic pole portion, which is formed by a magnet having a single magnetic pole and a salient pole (consequent pole) of a rotor core.

The rotor shown in FIG. 8 of the publication may reduce the amount of material used for the magnet but is affected by the magnetic flux of the stator when the rotor is rotated. Thus, a uniform flux content cannot be obtained in the circumferential direction at the salient pole portion and the desired characteristics thereby cannot be obtained.

SUMMARY OF THE INVENTION

It is an object of the present invention to provide a motor that reduces the amount of material used for the magnet while obtaining a rotor having uniform flux and thereby having superior characteristics.

To achieve the above object, one aspect of the present invention provides a motor including a stator and a rotor. The stator includes a stator core having a plurality of teeth and a coil wound around the teeth. The rotor includes a rotor core and a plurality of magnets fixed to the rotor core. The rotor includes a first unit and a second unit. The first unit includes a first magnet for an N-pole and a second magnet for an S-pole. The first and second magnets are alternately arranged along a circumferential direction of the rotor at equal angular intervals to form a plurality of magnetic pole portions. The second unit includes a third magnet of an N-pole or S-pole and a salient pole arranged in the rotor core. The salient pole functions as a magnetic pole differing from the third magnet. The third magnet and the salient pole are alternately arranged along the circumferential direction of the rotor to form a plurality of magnetic pole portions. The number of magnetic pole portions of the second unit is the same as the number of magnetic pole portions of the first unit. The third magnet and the magnet of the first unit having the same pole as the third magnet are aligned in an axial direction of the rotor.

A further aspect of the present invention provides a rotor including a rotor core and a plurality of magnets fixed to the rotor core. The rotor includes a first unit and a second unit. The first unit includes a first magnet for an N-pole and a second magnet for an S-pole. The first and second magnets are alternately arranged along a circumferential direction of the rotor at equal angular intervals to form a plurality of magnetic pole portions. The second unit includes a third magnet of an N-pole or S-pole and a salient pole arranged in the rotor core. The salient pole functions as a magnetic pole differing from the third magnet. The third magnet and the salient pole are alternately arranged along the circumferential direction of the rotor to form a plurality of magnetic pole portions. The number of magnetic pole portions of the second unit is the same as the number of magnetic pole portions of the first unit. The third magnet and the magnet of the first unit having the same pole as the third magnet are aligned in an axial direction of the rotor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1A:
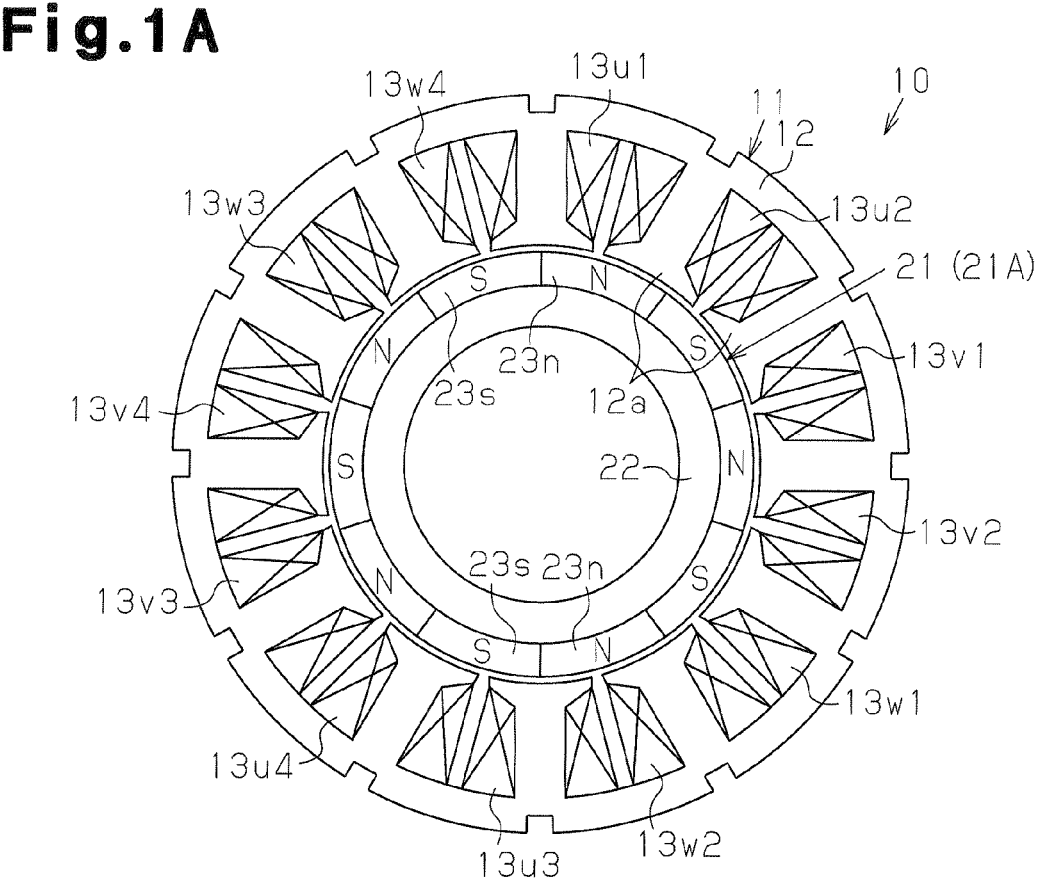
FIG. 1A is a cross-sectional view taken along a radial direction of a first unit of a brushless motor according to a first embodiment of the present invention, and more specifically, a cross-sectional view taken along line 1A-1A in FIG. 2.
Figure 1B:
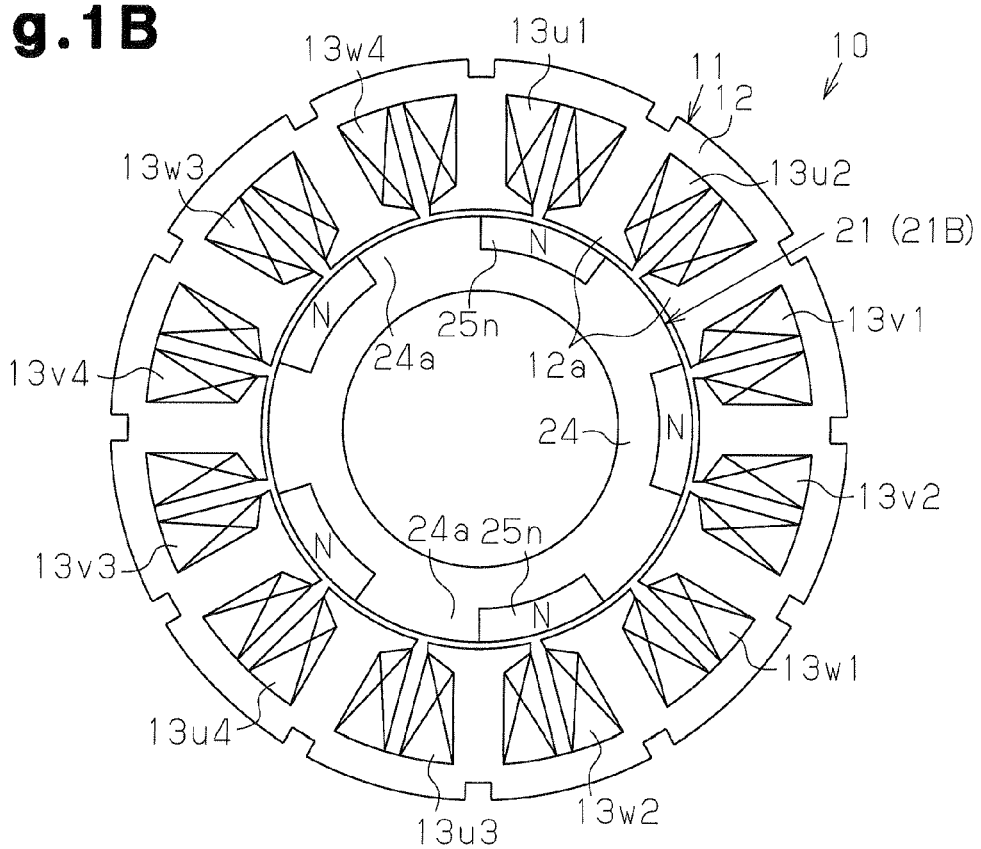
FIG. 1B is a cross-sectional view taken along a radial direction of a second unit of the brushless motor according to the first embodiment, and more specifically, a cross-sectional view taken along line 1B-1B in FIG. 2.

A first embodiment of the present invention will now be discussed with reference to FIGS. 1A to 3.

A brushless motor 10 of the present embodiment is of an inner rotor type including an annular stator 11 and a rotor 21, which is rotatably arranged at an inner side of the stator 11.

The stator 11 includes an annular stator core 12 having twelve teeth 12, which have identical shapes, extend radially inward, and are arranged at equal angular intervals in the circumferential direction. The stator core 12 is a stacked core formed by a plurality of magnetic metal plates stacked in an axial direction. A coil is wound into a concentrated winding around each tooth 12a of the stator core 12. In the stator 11, coils 13u1 to 13u4, 13v1 to 13v4, 13w1 to 13w4 for the three phases of U, V, and W phases are respectively wound around predetermined sections to form "twelve" magnetic pole portions.

In the present embodiment, the number of coils for each phase is four, and a total of 12 coils are wound in the order of U-phase, V-phase, W-phase, U-phase, V-phase, and W-phase so that two coils of the same phase are adjacent to each other. The adjacent coils of the same phase are wound in opposite directions, and the coils differing by 180° in angular positions are also wound in opposite directions.

The rotor 21 includes a first unit 21A and second units 21B that are joined together in the axial direction. The first unit 21A has an axial length that is one half the axial length of the rotor 21 and is located at the axially middle part. The second units 21B each have an axial length that is one fourth the axial length of the rotor 21 and are on axially opposite sides of the first unit 21A. The total axial length of the rotor 21 when the units 21A and 21B are joined is the same as the axial length of the stator core 12.

The first unit 21A includes a cylindrical first rotor core 22, which is formed by a plurality of stacked magnetic metal plates. A total of ten N-pole magnets (first magnet) 23n and S-pole magnets (second magnet) 23s are fixed to the outer surface of the first rotor core 22 so that the magnetic poles are arranged alternately in the circumferential direction (SPM structure). Therefore, the first unit 21A includes "ten" magnetic pole portions. The magnets 23n and 23s have a rectangular shape as viewed in the radial direction, an arcuate shape having a uniform thickness in the circumferential direction as viewed in the axial direction, and are arranged at an equal angular interval of 36°. The magnets 23n and 23s each use a radial oriented magnet polarized in the radial direction.

Each second unit 21B includes a cylindrical second rotor core 24, which is formed by a plurality of stacked magnetic metal plates. The second rotor core 24 includes five salient poles 24a arranged at an equal angular interval of 72°. The second rotor core 24 has an axial length that is one half the first rotor core 22 (one fourth the entire rotor 21). The second rotor core 24 is integrally coupled to each axial side of the first rotor core 22. The salient poles 24a are formed integrally with each second rotor core 24, identical in shape with the magnets 23n (23s) as viewed in the axial direction, and has an axial length that is one half the magnet 23n (one fourth of the entire rotor 21). Further, the salient poles 24a are axially aligned with the S-pole magnets 23s of the first unit 21A.

In each second rotor core 24, an N-pole magnet (third magnet) 25n is fixed in a recess between salient poles 24a that are adjacent to each other in the circumferential direction. Therefore, a total of five magnets 25n are arranged at an equal angular interval of 72° on the outer surface of each second rotor core 24. The magnets 25n are identical in shape with the magnets 23n and 23s as viewed in the axial direction and has an axial length that is one half the magnets 23n and 23s (one fourth the entire rotor 21). The magnet 25n is polarized in the same direction as the magnets 23n and 23s. The N-pole magnets 25n are axially aligned with the N-pole magnets 23n of the first unit 21A. Thus, the second unit 21B also has a total of "ten" magnetic pole portions, in which "five" magnetic pole portions are formed by the N-pole magnets 25n, and "five" magnetic pole portions are formed with the salient poles 24a (so-called consequent poles) consequently functioning as S-poles.

Figure 3:
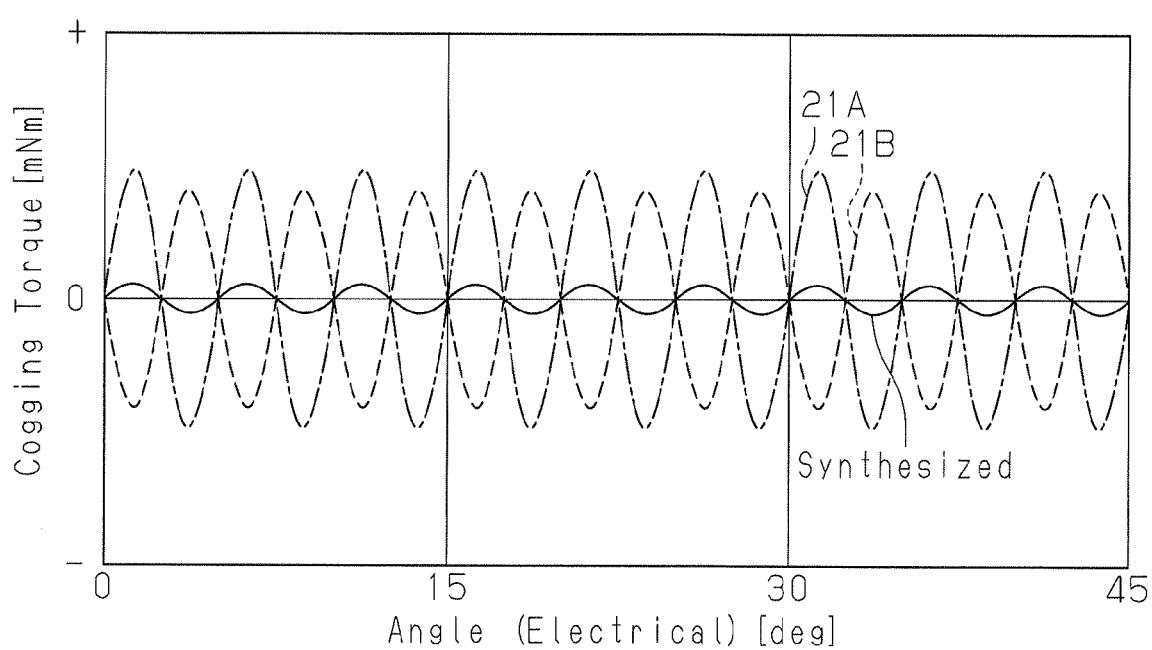
FIG. 3 is a waveform chart showing the cogging torque of the brushless motor according to the first embodiment.

FIG. 3 shows the waveform of cogging torque generated by the normal structure first unit 21A, which includes the bipolar magnets 23n and 23s, and the consequent pole type second unit 21B, which includes only the magnets 25n for one of the poles.

As shown in FIG. 3, the pulsation of the cogging torque generated at the consequent pole type second unit 21B is phase shifted by a 180° electrical angle, that is, at the reverse phase, with respect to the pulsation of the cogging torque generated at the normal structure first unit 21A. In the rotor 21 of the present embodiment having the two units 21A and 21B, pulsations in the cogging torques cancel each other. Thus, the pulsation of the synthesized cogging torque is extremely small, and vibration during rotational drive is reduced in the brushless motor 10 of the present embodiment, which uses the rotor 21.

The magnitudes of the cogging torque in the units 21A and 21B may be varied in accordance with the magnitude relation (e.g., axial length) and the polarization mode etc. of the magnets 23n, 23s, and 25n and salient poles 24a that are used. Thus, the magnitudes of the cogging torques in the units 21A and 21B, which have reverse phases, may be equalized by adjusting the above in the units 21A and 21B. The cogging torque may be further reduced in the overall rotor 21, and vibration of the brushless motor 10 may be further reduced.

The present embodiment has the characteristic advantages described below.

(1) The rotor 21 of the present embodiment includes the normal structure first unit 21A and the consequent pole second unit 21B. The first unit 21A includes N-pole and S-pole magnets 23n and 23s, which are alternately arranged in the circumferential direction. The second units 21B each include the N-pole magnets 25n, which are axially aligned with the N-pole magnets 23n of the first unit 21A, and the salient poles 24a, which function as the S-poles. The magnets 25n and the salient poles 24a are arranged alternately in the circumferential direction. Thus, the first unit 21A, which generates a uniform magnetic flux at each of the magnetic pole portion 23n and 23s, has a supplementary function for sending a normal magnetic flux to the salient poles 24a of the second unit 21B. Thus, the rotor 21 generates an overall uniform magnetic flux. As a result, the brushless motor 10 has superior characteristics. Further, the pulsation of the cogging torque generated at the second unit 21B is phase-shifted by 180° in electrical angle to a reverse phase with respect to the pulsation of the cogging torque generated at the first unit 21A (see FIG. 3). This cancels the pulsations of the cogging torques generated at the units 21A and 21B, and the pulsation of the synthesized cogging torque becomes extremely small. Thus, the vibration during rotational drive is reduced in the brushless motor 10 of the present embodiment that uses the rotor 21.

(2) In the rotor 21 of the present embodiment, the two second units 21B are arranged at the two axial sides of the first unit 21A. That is, the magnets 23s of the first unit 21A are arranged only on one axial side of the salient poles 24a of each second unit 21B. This reduces the magnetic flux leakage from the magnets 23s to the salient poles 24a and increases the effective magnetic flux that improves the output.

(3) In the present embodiment, the magnets 23n, 23s, and 25n in each of the units 21A and 21B are discrete from the magnets of another unit. Thus, the sizes (axial length etc.) of the magnets 23n, 23s, and 25n may be adjusted in each of the units 21A and 21B independently from other units, and the adjustment may decrease the cogging torque.

A second embodiment according to the present invention will now be discussed with reference to FIGS. 4 to 6.

In the brushless motor 10 of the present embodiment, the polarization mode of the magnets 23n, 23s, and 25n of the first and the second units 21A and 21B is further detailed.

Figure 4:
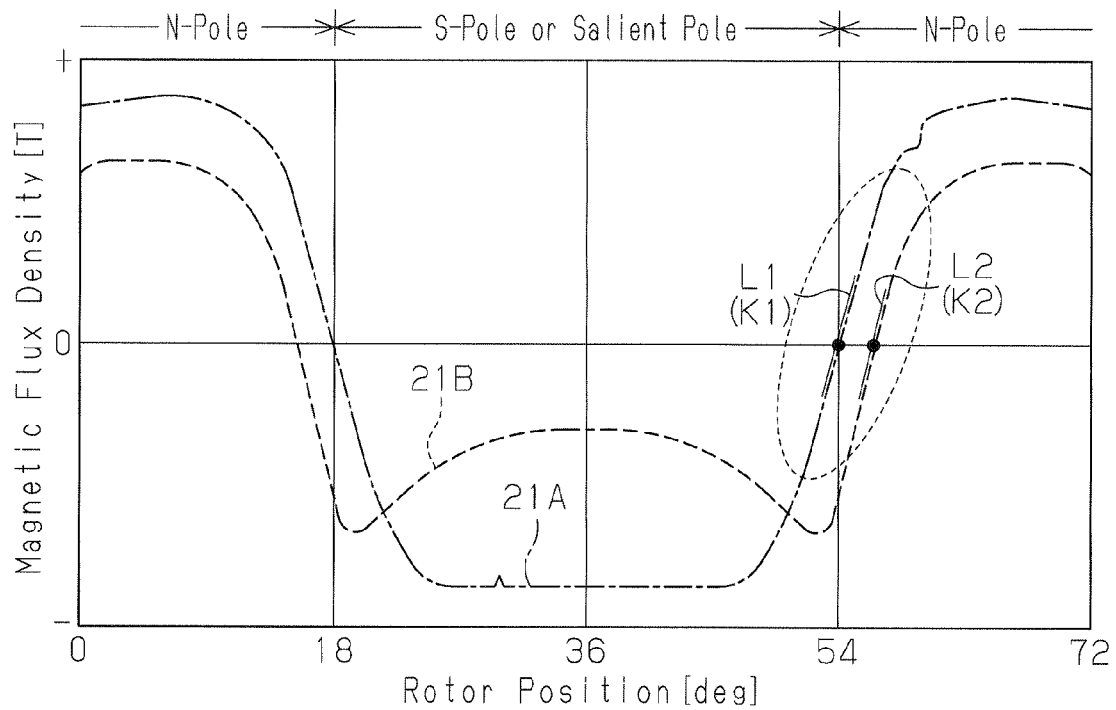
FIG. 4 is a diagram showing the correlation between the rotor position and the magnetic flux density of a brushless motor according to a second embodiment of the present invention.

FIG. 4 shows changes in the magnetic flux density in a positional range of 0° to 72° of the rotor 21 for each of the normal structure first unit 21A and the consequent pole second units 21B. The magnetic flux density indicates a value obtained at a height of 1 [mm] from the outer surface of the rotor 21 facing toward the stator 11. The range between 0° and 72° corresponds to a range in the first unit 21A from the center of the magnetic pole of the N-pole magnet 23n to the center of the magnetic pole of the next N-pole magnet 23n with a single S-pole magnet 23s arranged therebetween. Further, the range between 0° and 72° corresponds to a range in the second unit 21B from the center of the magnetic pole of the N-pole magnet 25n to the center of the magnetic pole of the next N-pole magnet 25n with a single salient pole 24a arranged therebetween. In FIG. 4, the change in the magnetic flux density of the first unit 21A is shown by the single-dashed line in FIG. 4, and the change in magnetic flux density of the second unit 21B is shown by the broken line. The positions of 18° and 54° of the rotor 21 correspond to a boundary between the magnets 23n and 23s in the first unit 21A and to a boundary between the magnet 25n and the salient pole 24a in the second unit 21B.

In each of the units 21A and 21B, the magnetic flux density increases toward the positive side at the N-pole magnets 23n and 25n, and the magnetic flux density increases toward the negative side (magnetic flux direction that is opposite to the S-pole) at the S-pole magnet 23s and the salient pole 24a functioning as the S-pole. In the N-pole magnets 23n and 25n and the S-pole magnets 23s, the magnetic flux density changes constantly in a predetermined region including the center of the magnetic pole. In the salient poles 24a, the magnetic flux density changes so as to be recessed at the center of the magnetic pole. The magnetic flux density changes from the positive side to the negative side or in the opposite direction near the boundary between the magnetic poles.

The magnets 23n, 23s, and 25n are each radial oriented polarized. At each of the magnets 23n, 23s, and 25n, when the polarization rate (hereinafter referred to as boundary polarization rate) at a circumferential end including the boundary of magnetic pole portions (in the present embodiment, end region of 3.6°, which is one tenth the magnet angle region) is changed with respect to the circumferentially central part including the center portion of the magnetic pole, the gradient (e.g., gradient in the region changing from the S-pole to the N-pole surrounded by a broken line in FIG. 4) of the change in the magnetic flux density changes in accordance with the polarization rate. As will be described later (see FIG. 6), in the first unit 21A, as the boundary polarization rate of the magnets 23n and 23s decreases, the gradient k1 (slope of change in magnetic flux density) of a tangent line L1 of, for example, a magnetic flux density "0" portion becomes smaller. On the other hand, as the boundary polarization rate increases until it becomes equal to the circumferentially central part, the gradient k1 of the tangent line L1 becomes larger. In the second unit 21B, as the boundary polarization rate of the magnet 25n decreases, a gradient k2 of a tangent line L2 of, for example, the magnetic flux density "0" portion becomes slightly larger.

On the other hand, as the boundary polarization rate increases, the gradient k2 of the tangent line L2 becomes smaller.

Figure 5:
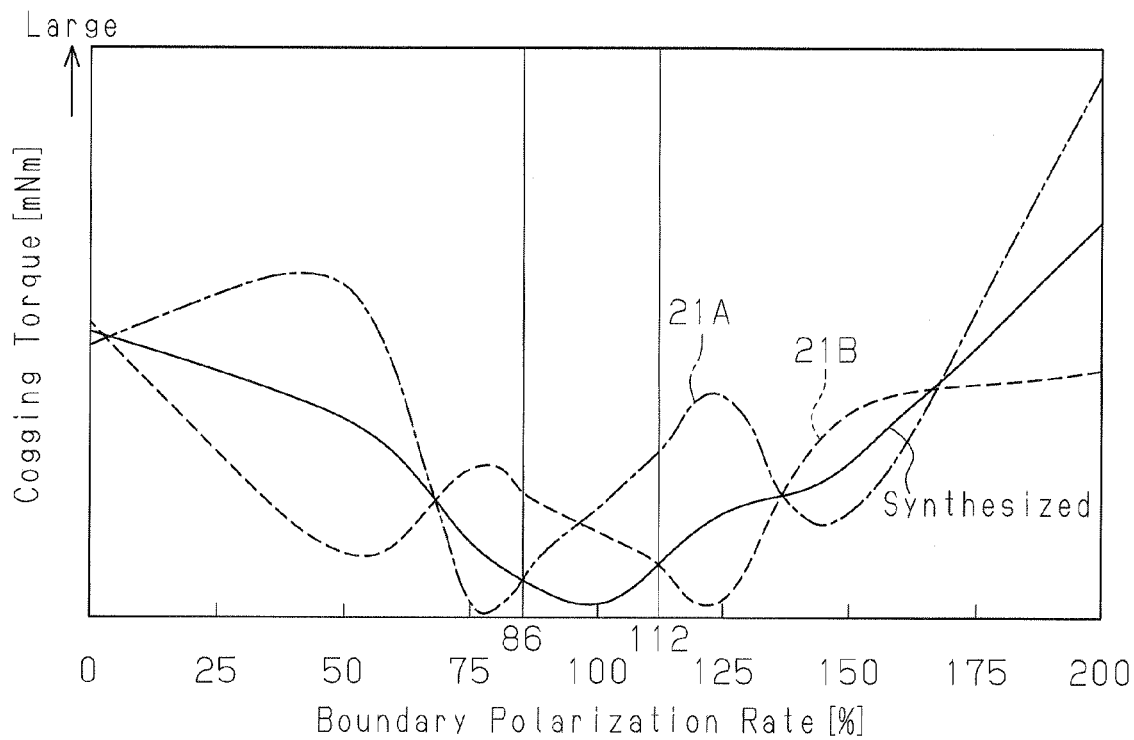
FIG. 5 is a diagram showing the correlation between the boundary polarization rate and the cogging torque of the brushless motor according to the second embodiment.
Figure 6:
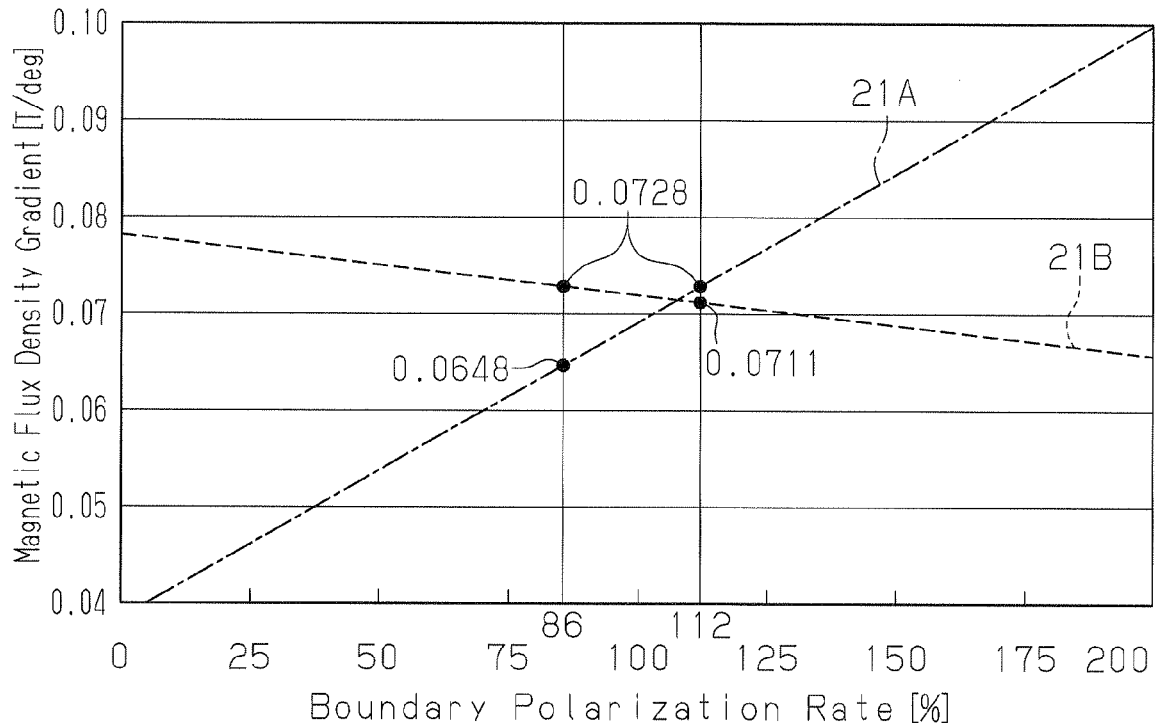
FIG. 6 is a diagram showing the correlation between the boundary polarization rate and the change in magnetic flux density of the brushless motor according to the second embodiment.

FIG. 5 shows changes in the cogging torque when the polarization rate (boundary polarization rate) at the circumferential end (boundary of magnetic pole portions) is changed with respect to the circumferentially central part (center portion of magnetic pole) in the magnets 23n and 23s and the magnets 25n. In FIG. 5, the polarization rate at the circumferential end is changed with respect to the circumferentially central part of the magnets 23n and 23s and the magnet 25n. The boundary polarization rate is "100%" at where the synthesized cogging torque (solid line in FIG. 5), in which the cogging torque (single-dashed line in FIG. 5) of the first unit 21A and the cogging torque (broken line in FIG. 5) of the second unit 21B are synthesized, becomes the smallest. Further, the boundary polarization rate when the circumferential end is equally polarized with the circumferentially central part is "200%".

As apparent from FIG. 5, the synthesized cogging torque, that is, the cogging torque of the entire rotor 21 is smaller than the cogging torque of each of the units 21A and 21B within a range in which the boundary polarization rate is greater than or equal to "86%" and less than or equal to "112%". Thus, vibration of the motor 10 is reduced in this range. FIG. 6 shows the correlation between the boundary polarization rate of the magnets 23n, 23s, and 25n and the gradients k1 and k2 of the tangent lines L1 and L2. As shown in FIG. 6, in a range in which the boundary polarization rate is greater than or equal to "86%" and less than or equal to "112%", at which the synthesized cogging torque becomes lower than the cogging torque of each of the units 21A and 21B, the gradient k1 is greater than or equal to "0.0648" and less than or equal to "0.0728" in the magnets 23n and 23s of the first unit 21A, and the gradient k2 is greater than or equal to "0.0711" and less than or equal to "0.0728" in the magnet 25n of the second unit 21B. The unit of a value representing the "slope" is [T/deg], where "T" represents the magnetic flux density, and "deg" represents the rotor position.

In the present embodiment, the magnets 23n, 23s, and 25n having the boundary polarization rate for realizing the gradients k1 and k2 of the above range are used. This lowers the synthesized cogging torque and reduces vibration of the motor 10.

The present embodiment has the characteristic advantages described below.

(1) In the present embodiment, the gradient k1 of the change in magnetic flux density (tangent line L1) at the boundary of the magnetic pole portions of the magnets 23n and 23s is set within the range of $0.0648 \leq k1 \leq 0.0728$ in the first unit 21A of the rotor 21. Further, the gradient k2 of the change in magnetic flux density (tangent line L2) at the boundary of the magnetic pole portions of the magnet 25n is set within the range of $0.0711 \leq k2 \leq 0.0728$ in the second unit 21B. As a result, the synthesized cogging torque of the rotor 21 is reduced in a preferable manner, as apparent from FIGS. 5 and 6. This contributes to further reducing vibration in the brushless motor 10.

The first and the second embodiments of the present invention may be modified as described below.

The structure of the rotor 21 according to the first and the second embodiments may be changed as shown in FIGS. 7 to 11.

Figure 7:
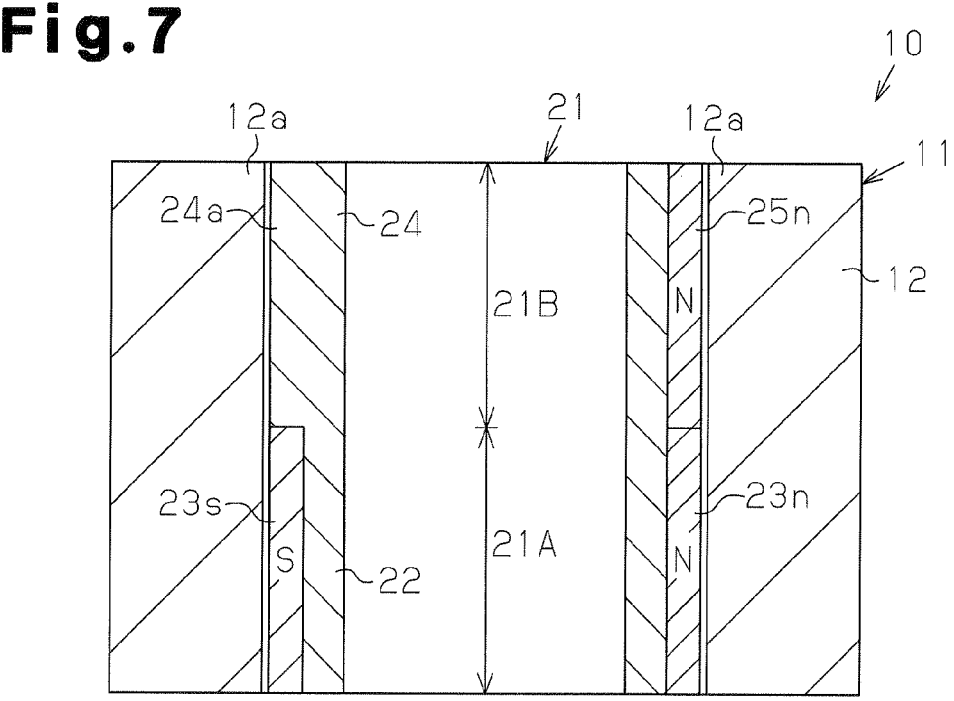
FIGS. 7 to 11 are cross-sectional views taken along the axial direction of other examples of the brushless motor.

The rotor 21 shown in FIG. 7 includes a consequent pole second unit 21B having an axial length (one half the entire axial length) that is equal to the axial length of the normal structure first unit 21A. The first and the second units 21A and 21B are axially connected. Such a rotor 21 may be simply formed just by coupling the two units 21A and 21B in the axial direction. This facilitates the manufacturing of the rotor 21.

Figure 8:
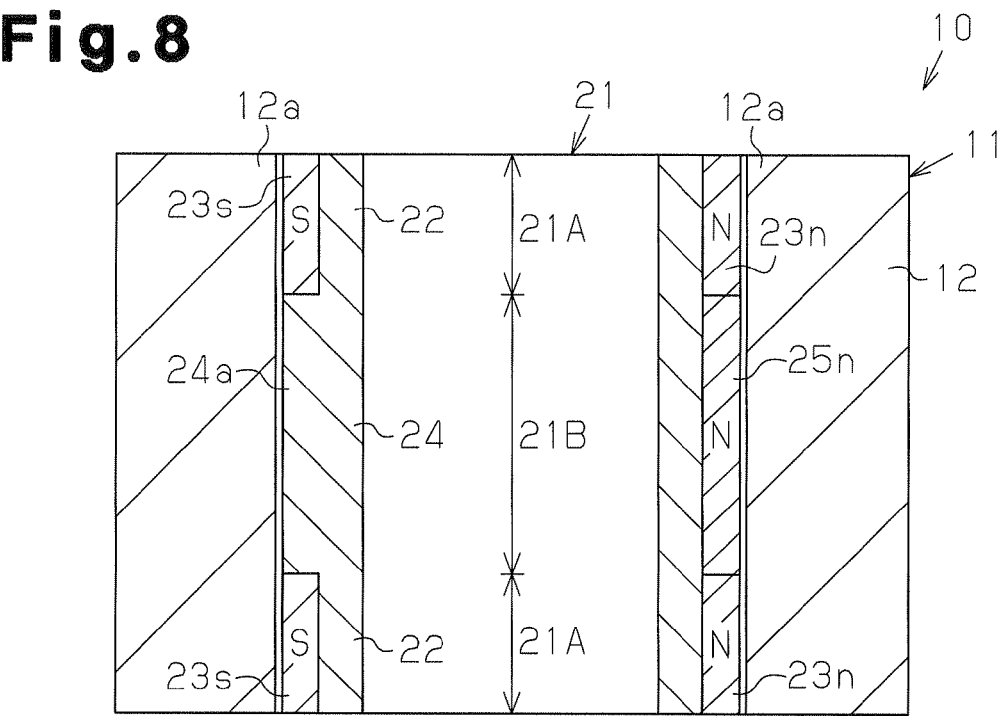

The rotor 21 shown in FIG. 8 includes two normal structure first units 21A, each having an axial length that is one fourth the axial length of the entire rotor 21, and a consequent pole second unit 21B having an axial length that is one half the axial length of the entire rotor 21. The first units 21A are coupled to the two axial sides of the second unit 21B. That is, the units 21A and 21B are reversed from that of the first and the second embodiments.

Figure 9:
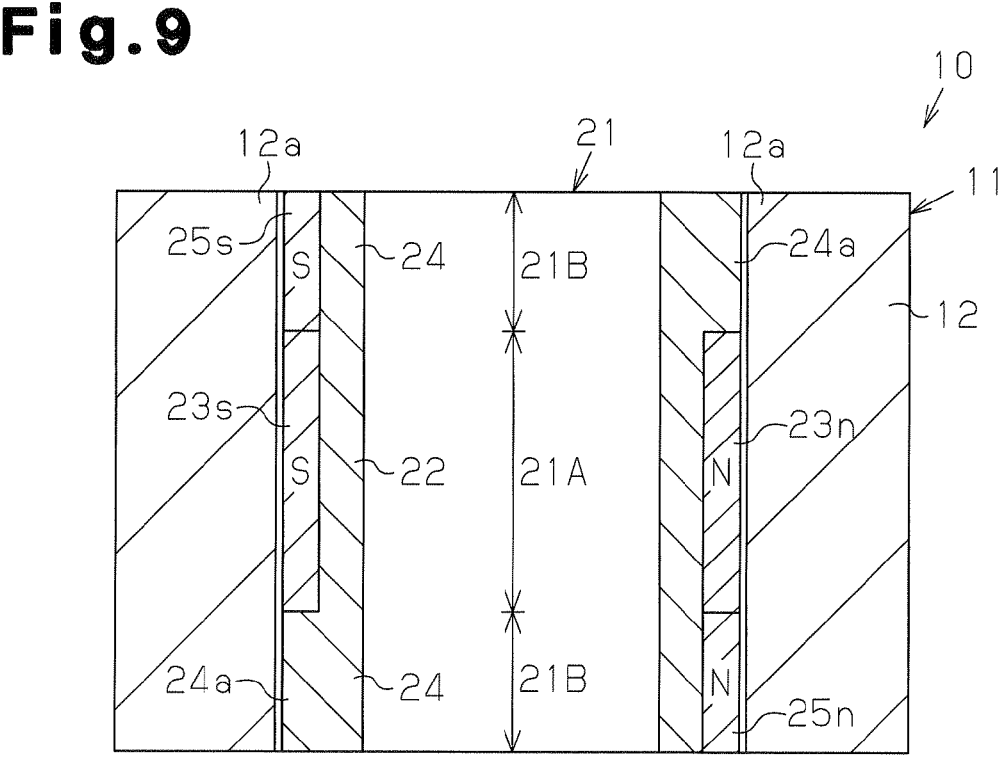

The rotor 21 shown in FIG. 9 includes a consequent pole second unit 21B, which includes the N-pole magnets 25n and the salient poles 24a functioning as the S-poles, and a consequent pole second unit 21B, which includes the S-pole magnet 25s and the salient pole 24a functioning as the N-poles. The second units 21B are coupled to the two axial sides of the normal structure first unit 21A. This results in a satisfactory magnetic balance. Further, the magnets 23n and 23s are arranged on only one axial side of the salient poles 24a. This reduces the magnetic flux leakage from the magnets 23n and 23s to the salient poles 24a.

Figure 10:
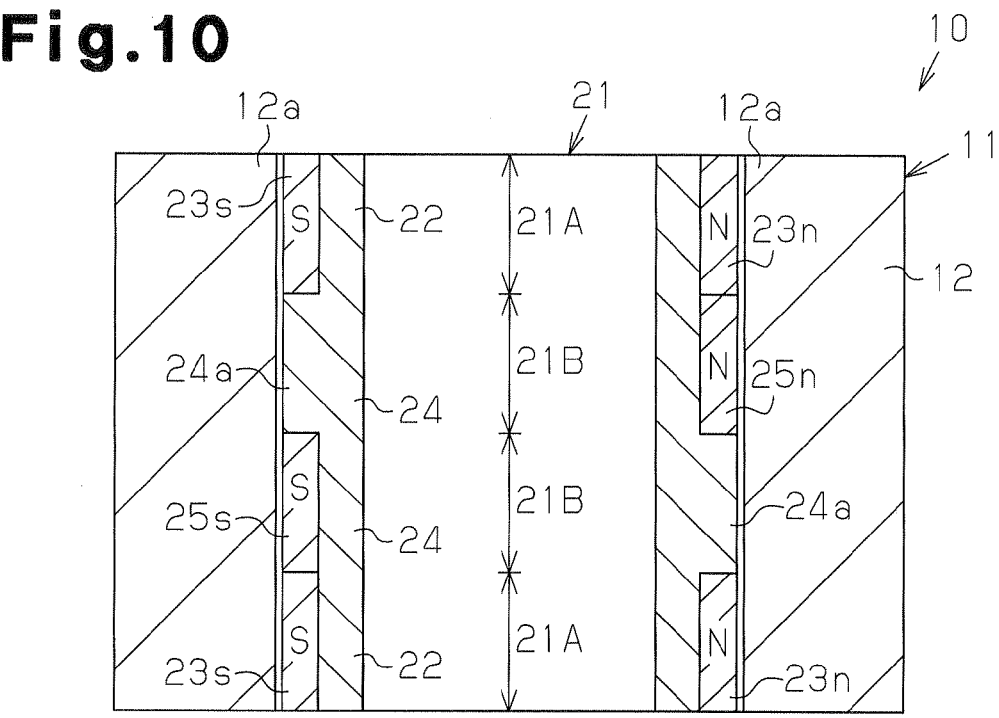

The rotor 21 shown in FIG. 10 includes a consequent pole second unit 21B, which includes the N-pole magnet 25n and the salient pole 24a functioning as the S-poles, and a consequent pole second unit 21B, which includes the S-pole magnets 25s and the salient poles 24a functioning as the N-poles. The two second units 21B are coupled to each other in the axial direction. The rotor 21 also includes two normal structure first units 21A, each having an axial length that is one fourth the axial length of the entire rotor 21. The first units 21A are coupled to the two axial sides of the coupled pair of second units 21B. The rotor 21 formed in such a manner also has satisfactory magnetic balance.

Figure 11:
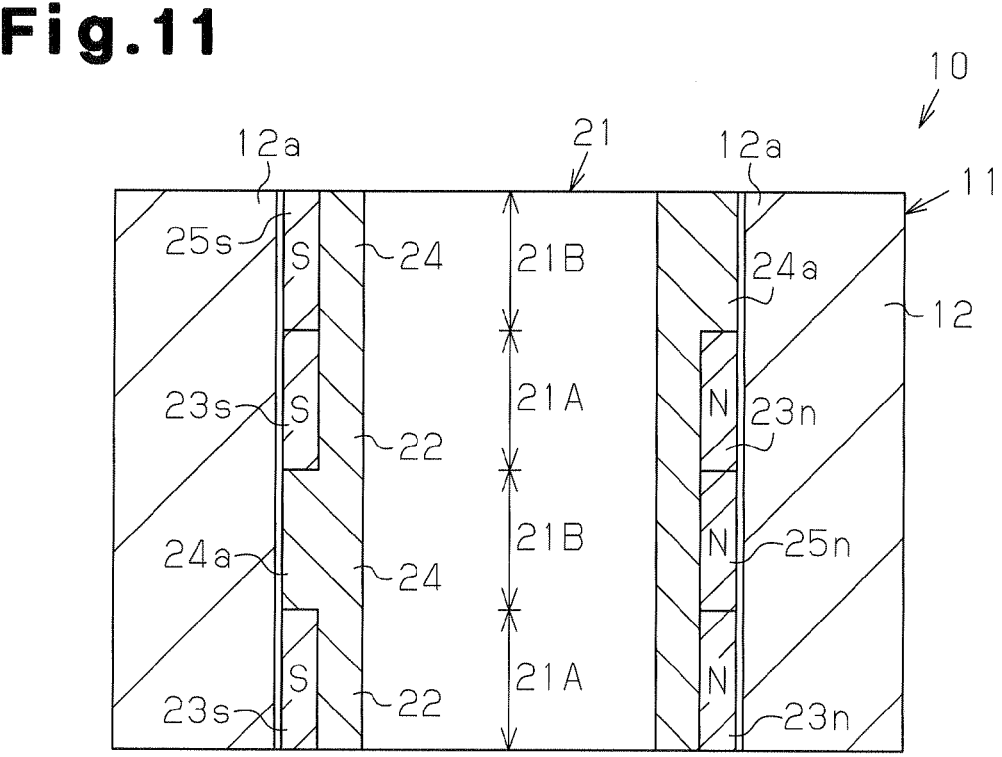

The rotor 21 shown in FIG. 11 includes a consequent pole second unit 21B, which includes the N-pole magnet 25n and the salient pole 24a functioning as the S-pole, and a consequent pole second unit 21B, which includes the S-pole magnet 25s and the salient pole 24a functioning as the N-poles. The rotor 21 also includes two normal structure first units 21A having an axial length that is one fourth the axial length of the entire rotor 21. The first units 21A and the second units 21B are alternately coupled in the axial direction. The rotor 21 formed in such manner also has a satisfactory magnetic balance.

The modifications of FIGS. 7 to 11 may also be applied to each of the embodiments described below.

Figure 12:
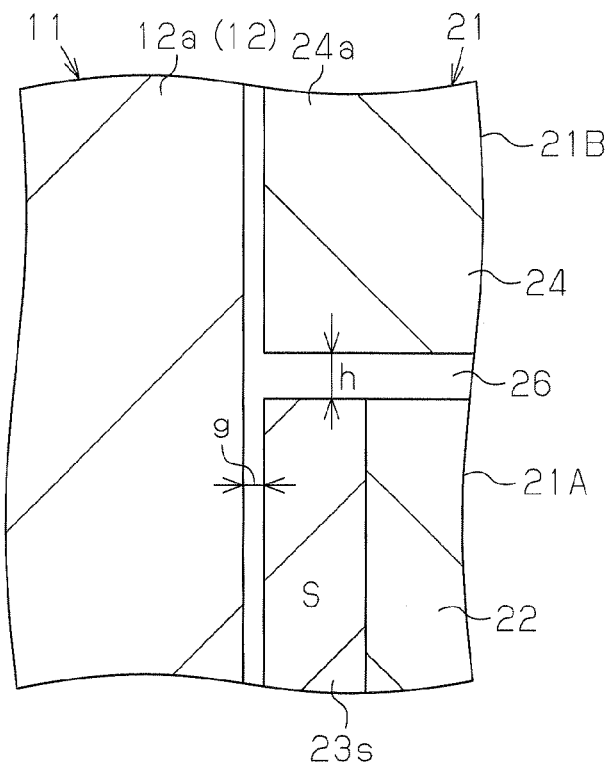
FIG. 12 is an enlarged cross-sectional view taken along the axial direction of another example of the brushless motor.

In the first and the second embodiments, the rotor 21 is formed such that the first and the second units 21a and 21B are continuous in the axial direction. However, as shown in FIG. 12, a spacer 26 may be formed between the first and second rotor cores 22 and 24 of the first and the second units 21A and 21B. Specifically, the spacer 26 may be formed between the magnets 23s of the first unit 21A and the salient poles 24a of the second unit 21B. This reduces the magnetic flux leakage from the magnet 23s of the first unit 21A to the salient pole 24A of the second unit 21B. The spacer 26, which magnetically separates the magnet 23s and the salient pole 24a, may be a void or may be formed by a non-magnetic material such as resin material.

Figure 13:
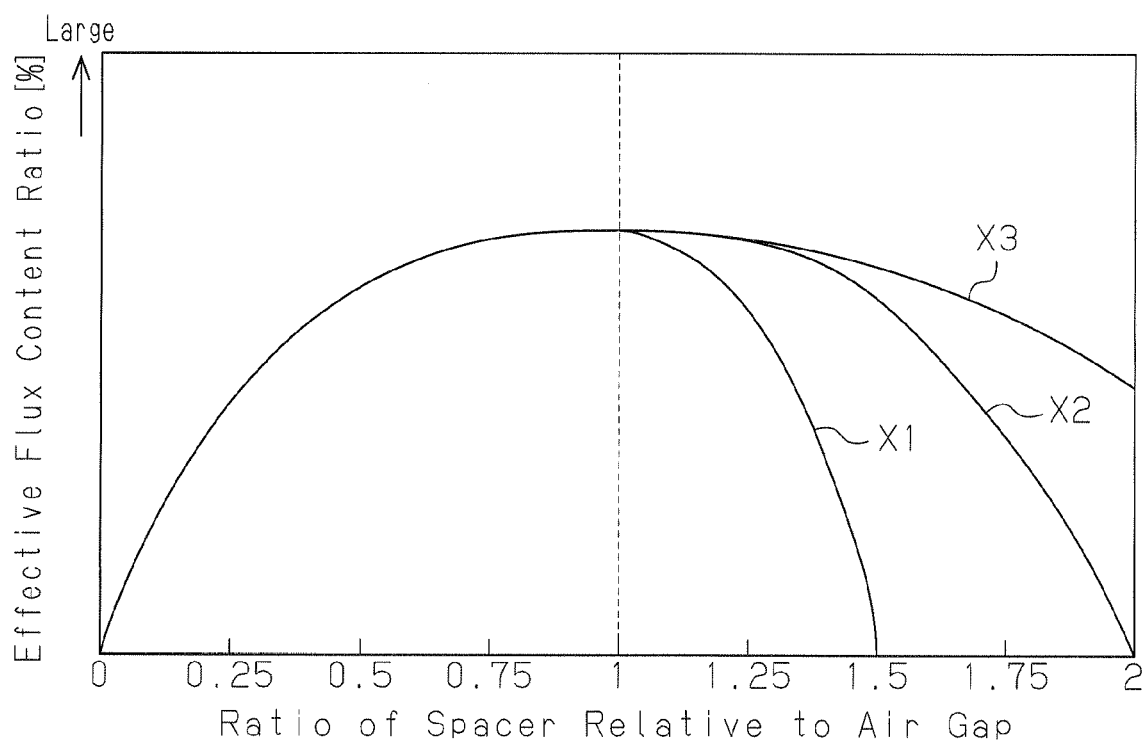
FIG. 13 is a diagram showing the correlation between the ratio of a spacer with respect to an air gap and an effective flux content ratio of another example of the brushless motor.

FIG. 13 shows the correlation between the ratio (h/g) of a dimension h of the spacer 26 with respect to an air gap g (clearance between the rotor 21 and the stator 11) shown in FIG. 12 relative to the change in flux content ratio. Here, h/g=1 indicates that the dimension h of the spacer 26 is equal to the air gap g. The dimension h of the spacer 26 is smaller than the air gap g when h/g is less than one, and the dimension h of the spacer 26 is larger than the air gap g when h/g is greater than one. FIG. 13 compares rotors 21 having three different axial lengths X1, X2, and X3. Here, X2 is two times longer than X1, and X3 is four time longer than X1.

As apparent from FIG. 13, the effective flux content ratio increases as h/g approaches "1". It is assumed that this is because the leakage magnetic flux of the magnets 23s toward the salient poles 24a decreases and thereby increases the effective flux content when the dimension h of the spacer 26 is enlarged and becomes the same as the air gap g. Further, the effective flux content ratio decreases as h/g becomes greater than "1". It is assumed that this is because the magnetic flux of the magnet 23s decreases when the dimension h of the spacer 26 becomes larger than or equal to the air gap g while the axial length of the magnet 23s becomes shorter since the axial length of the rotor 21 does not change. Accordingly, as apparent from FIG. 13, it is preferable that h/g be greater than or equal to "0.5", and further preferable that h/g be greater than or equal to "0.75". It is more preferable that the upper limit of h/g be "1".

A third embodiment according to the present invention will now be discussed with reference to FIGS. 14A to 16 centering on differences from the first embodiment.

The brushless motor 10 of the present embodiment includes a cylindrical housing 15 having one end defining an open portion 15a and another end defining a bottom portion 15b. The stator 11 is inserted into the housing 15 from the open portion 15a and press-fitted or heat-fitted and fixed to the inner surface of the housing 15. The housing 15 may be part of a magnetic circuit or may be excluded from a magnetic circuit. A disk-shaped end frame 16 is attached to the open portion 15a so that the open portion 15a is closed by the end frame 16. Bearings 17 and 18, which rotatably support a rotation shaft 26 of the rotor 21, are respectively arranged at the central part of the bottom portion 15b of the housing 15 and the central part of the end frame 16.

Figure 14A:
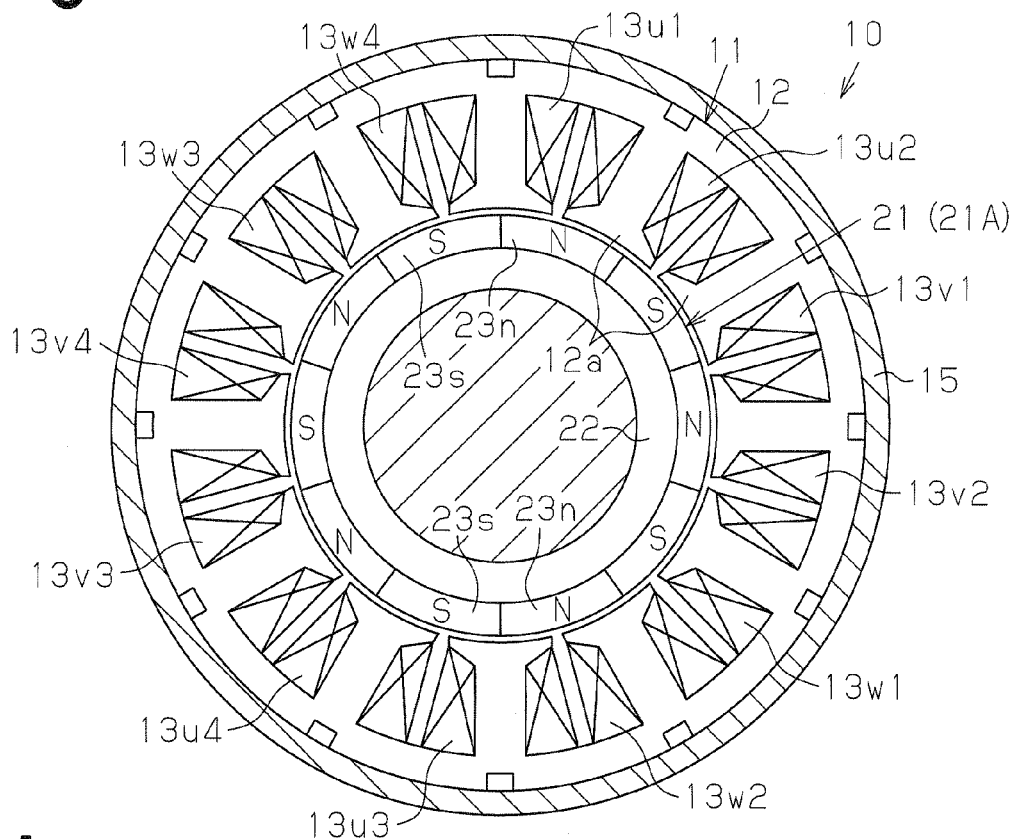
FIG. 14A is a cross-sectional view taken along a radial direction of a first unit of a brushless motor according to a third embodiment of the present invention, and specifically, a cross-sectional view taken along line 14A-14A in FIG. 15.
Figure 14B:
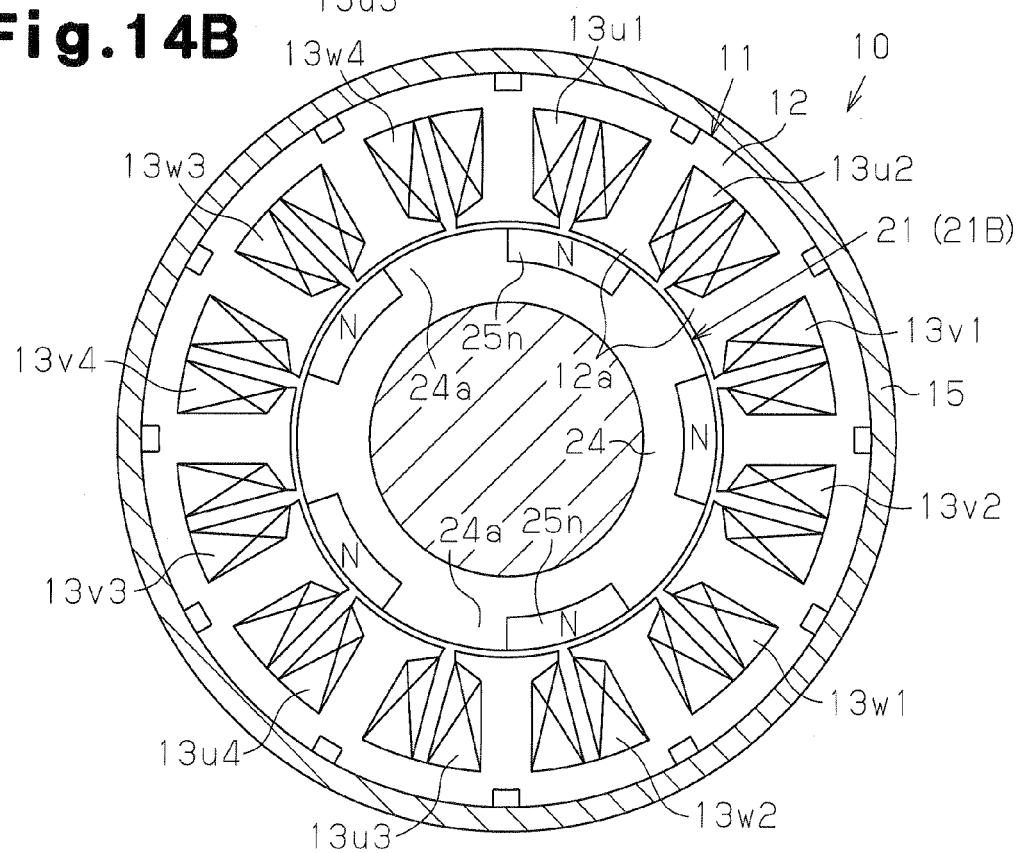
FIG. 14B is a cross-sectional view taken along a radial direction of a second unit of the brushless motor according to the third embodiment, and specifically, a cross-sectional view taken along line 14B-14B in FIG. 15.
Figure 15:
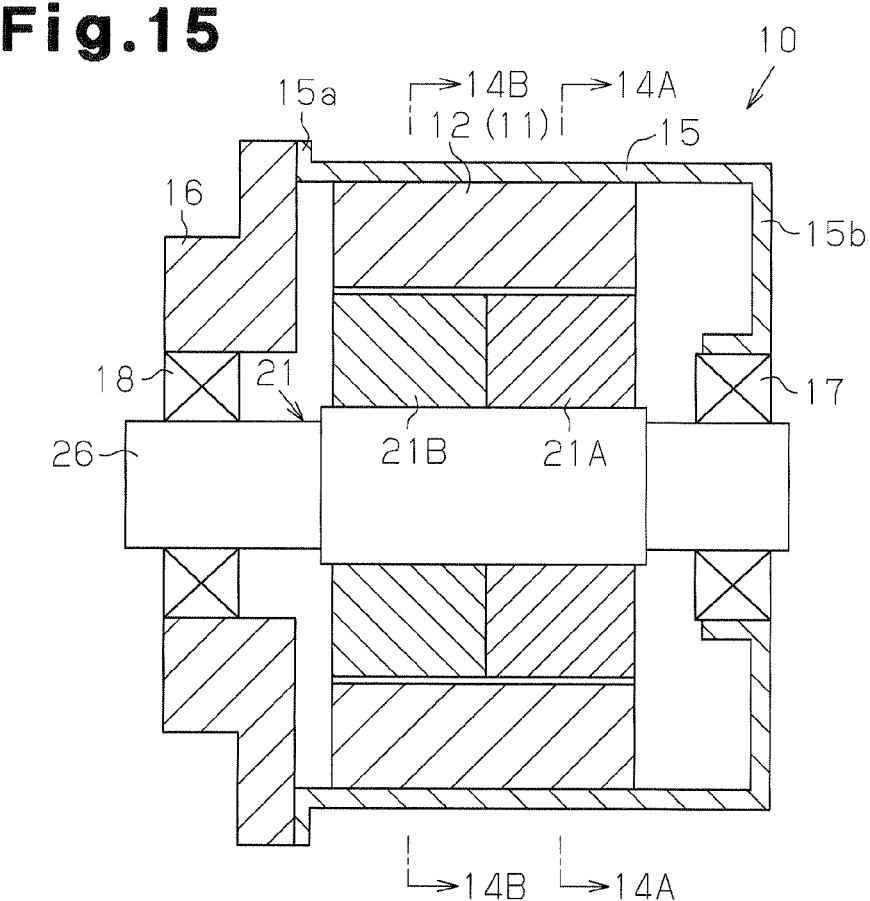
FIG. 15 is a cross-sectional view taken along an axial direction of the brushless motor according to the third embodiment.

As shown in FIGS. 14A to 15, the rotor 21 is formed by the first unit 21A and the second unit 21B, which are joined together in the axial direction and fixed to the rotation shaft 26. The first unit 21A and the second unit 21B each have a structure that is basically the same as the first and the second embodiments. In other words, the rotor 21 of the present embodiment has a structure that is basically the same as the rotor 21 of FIG. 7. The first rotor core 22 of the first unit 21A is press-fitted and fixed to the rotation shaft 26. The first unit 21A has an axial length that is one half the axial length of the stator core 12. The second unit 21B also has an axial length that is one half the axial length of the stator core 12.

The second rotor core 24 of the second unit 21B has an axial length that is the same as the first rotor core 22. The second rotor core 24 is integrally coupled with the first rotor core 22 and also press-fitted and fixed to the rotation shaft 26.

In the rotor 21 of the present embodiment, the pulsation of the cogging torque generated at the first unit 21A and the pulsation of the cogging torque generated at the second unit 21B act to cancel each other out in the same manner as in the description referring to FIG. 3. Otherwise, the rotor 21 of the present embodiment is substantially the same as those of the first and the second embodiments.

Figure 16:
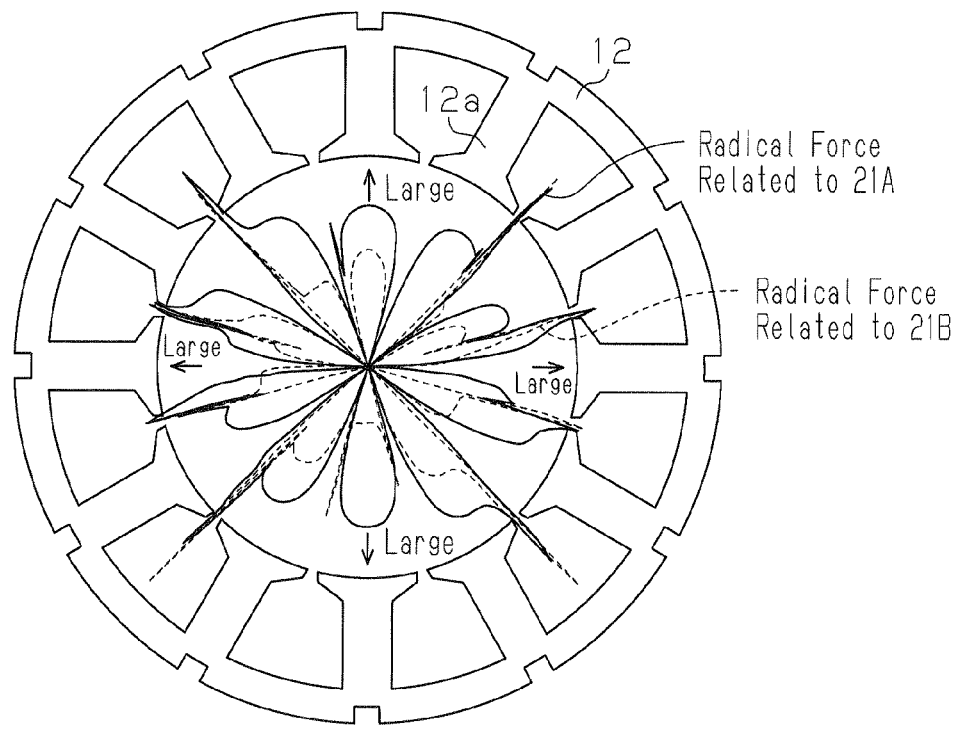
FIG. 16 is a diagram showing the radial force that acts on the stator core of the brushless motor according to the third embodiment.

FIG. 16 shows a radial force that acts on the stator core 12 due to attracting and repelling forces generated between the stator 11 and the rotor 21. The radial force is shown in correspondence with the circumferential position of the stator core 12 and becomes stronger towards the radially outer side. The radial force that acts on the stator core 12 deforms the housing 15 and consequently vibrates the brushless motor 10.

In the present embodiment, the magnetic force differs between the normal structure first unit 21A, which uses the first and second magnets 23n and 23s, and the consequent pole second unit 21B, which uses only the third magnets 25n. Thus, the radial force that acts on the stator core 12 is smaller in the second unit 21B, the magnetic force of which is smaller than the first unit 21A. The radial force that acts on the stator core 12 during rotation of the rotor 21 is not uniform in the circumferential direction. This vibrates the stator core 12 which, in turn, vibrates the housing 15. Therefore, a difference in radial force is generated in the housing 15 between the opposing portion of the first unit 21A and the opposing portion of the second unit 21B. This produces a difference in the magnitude of the vibration at different portions of the housing 15. In addition, the open portion 15a of the housing 15 to which the end frame 16 is attached has low rigidity. Thus, when the stator core 12 near the open portion 15a receives a large radial force, the deformation of the housing 15 increases. This increases vibration.

Taking this matter into consideration, the motor 10 of the present embodiment has a structure in which the second unit 21B of the rotor 21 is arranged closer to the open portion 15a of the housing 15 than the first unit 21A. Specifically, the second unit 21B, the radial force of which is small, is arranged toward the open portion 15a, at which the rigidity of the housing 15 is low. The first unit 21A, the radial force of which is large, is arranged toward the bottom portion 15b, at which the rigidity of the housing 15 is high. In other words, in the present embodiment, the units 21A and 21B are effectively arranged in view of the rigidity of the housing 15 to suppress deformation of the housing 15 in a preferable manner.

The present embodiment has the characteristic advantages described below.

(1) In comparison with the first unit 21A, the second unit 21B uses less magnets and has a smaller magnetic force. Therefore, the radial force that acts on the stator core 12 is smaller in the second unit 21B than in the first unit 21A. Taking this into consideration, the second unit 21B, which has a small radial force, is arranged toward the open portion 15a of the housing 15 at which the rigidity is low, and the first unit 21A, which has a large radial force, is arranged toward the bottom portion 15b of the housing 15 at which the rigidity is high. This suppresses vibration of the housing 15 caused by the radial force acting on the stator core 12 and reduces vibration of the motor 10. Further, there is no need for a member used to suppress vibration, and the rotor 21 and stator 11 are arranged near the open portion 15a of the housing 15. This contributes to reduction in the number of components and miniaturization of the housing 15.

(2) In the present embodiment, the open portion 15a at one end of the housing 15 is closed by the end frame 16. Further, the single first unit 21A and single second unit 21B are axially aligned with each other, with the second unit 21B being arranged closer to the open portion 15a of the housing 15 than the first unit 21A. This simplifies the structure of the rotor 21 and facilitates manufacturing. Further, the vibration of the housing 15 is suppressed and vibration of the motor 10 is reduced.

The third embodiment of the present invention may be modified as below.

Figure 17:
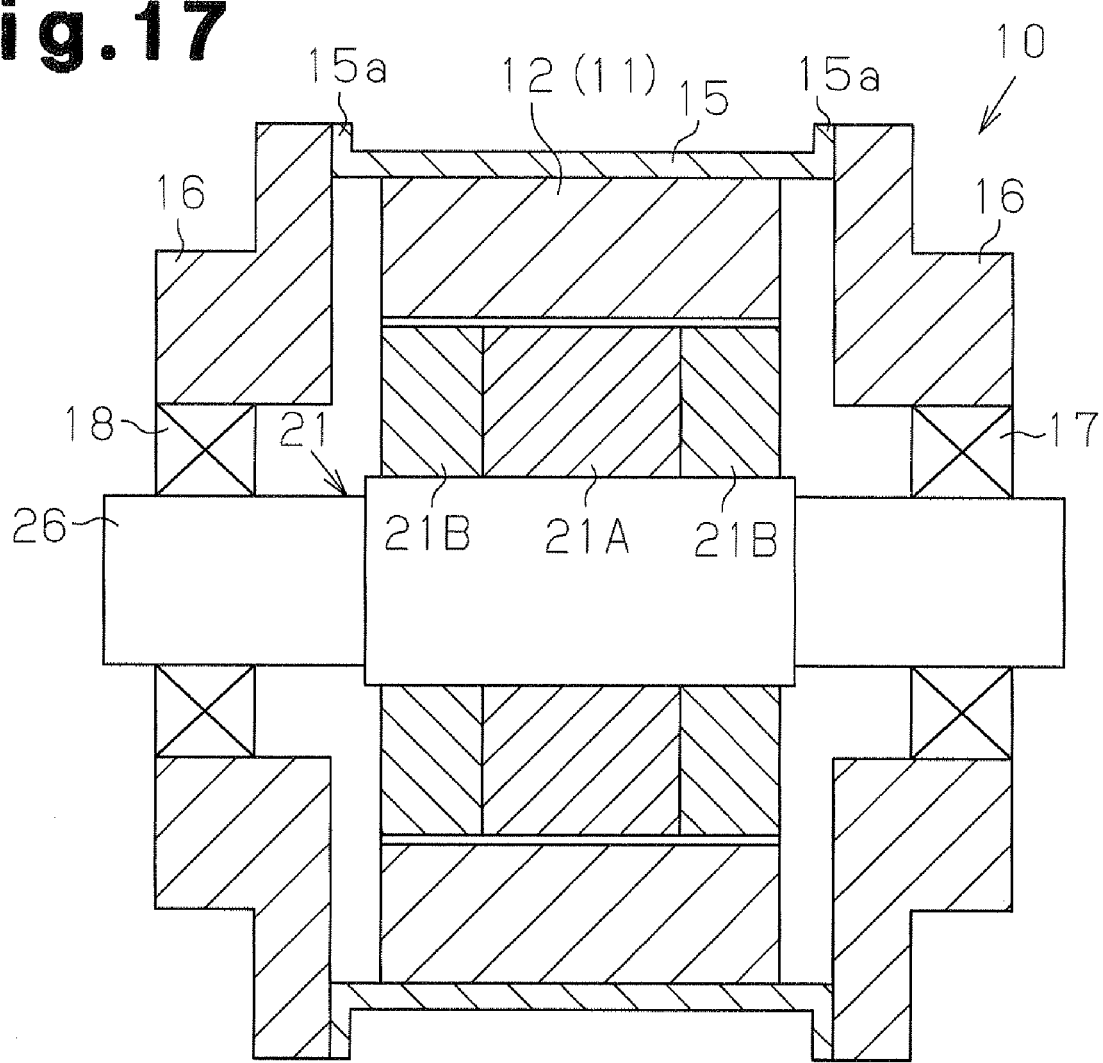
FIG. 17 is a cross-sectional view taken along the axial direction of another example of the brushless motor.

As shown in FIG. 17, the housing 15 may be cylindrical and have both ends defining open portions 15a, each closed by end frames 16. In this case, in the same manner as the rotor 21 of FIG. 2, two second units 21B are respectively arranged at the two axial sides of the first unit 21A. In other words, the second unit 21B is arranged closer to the open portion 15a of the housing 15 than the first unit 21A. That is, each second unit 21B having a small radial force is arranged toward the open portion 15a of the housing 15 at which the rigidity is low, and the first unit 21A having a large radial force is spaced apart from the open portions 15a and arranged at the central part of the housing 15 at which the rigidity is high. This realizes an effective arrangement. This suppresses vibration of the housing 15 caused by the radial force acting on the stator core 12, and vibration of the motor 10 is further reduced. Further, the housing 15 is cylindrical and has two open ends. This simplifies the structure of the housing 15 and facilitates manufacturing of the housing 15.

Figure 2:
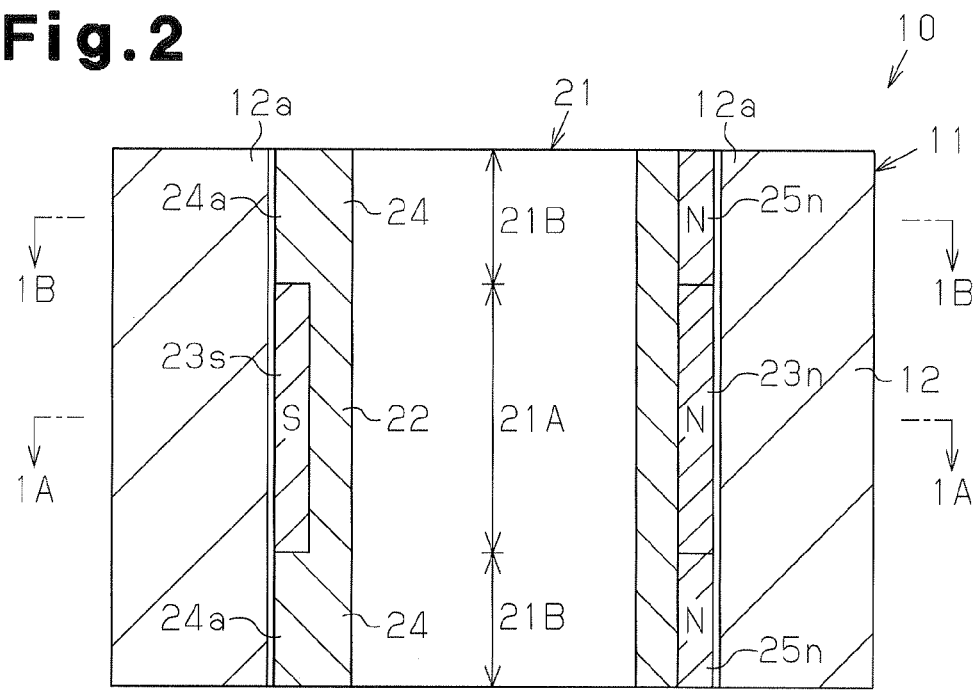
FIG. 2 is a cross-sectional view taken along an axial direction of the brushless motor according to the first embodiment.

In the same manner as the rotor 21 of FIG. 2, the two second units 21B may include third magnets 25n having the same magnetic pole. Further, in the same manner as the rotor 21 of FIG. 9, the two second units 21B may include third magnets 25n having different magnetic poles. In this case, the magnetic balance of the second unit 21B is satisfactory.

In the third embodiment, the magnets 23n, 23s, and 25n of the first and the second units 21A and 21B were not particularly described. However, the magnets 23n, 23s, and 25n may be divided between the units 21A and 21B. This would allow for the size (axial length, etc.) of the magnets 23n, 23s, and 25n to be adjusted easily and independently in each of the units 21A and 21B. It is obvious that the structure shown in FIG. 12 is also applicable.

A fourth embodiment according to the present invention will now be discussed with reference to FIGS. 18A to 23 centering on differences from the third embodiment.

The brushless motor 10 of the present embodiment is a modified example of the motor 10 shown in FIGS. 14A to 15 of the third embodiment.

Figure 18A:
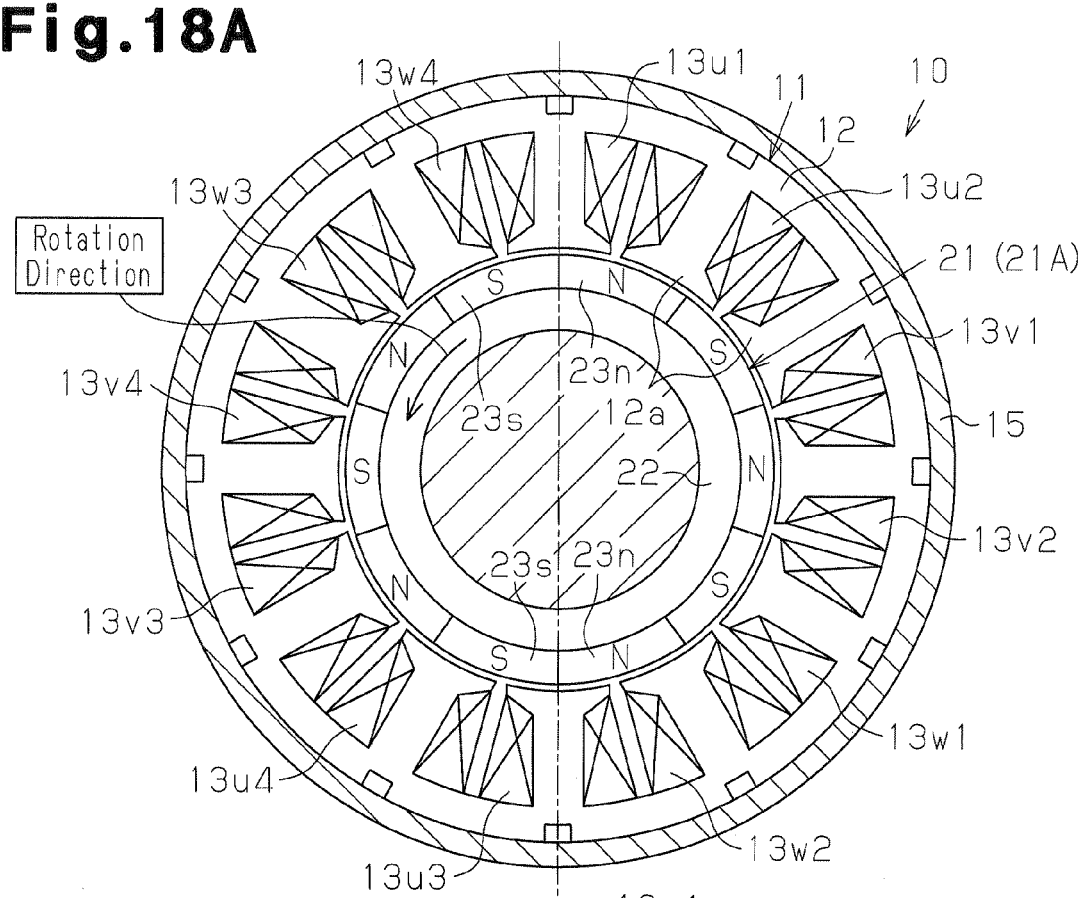
FIG. 18A is a cross-sectional view taken along a radial direction of a first unit of a brushless motor according to a fourth embodiment of the present invention, and specifically, a cross-sectional view taken along line 18A-18A in FIG. 19.
Figure 18B:
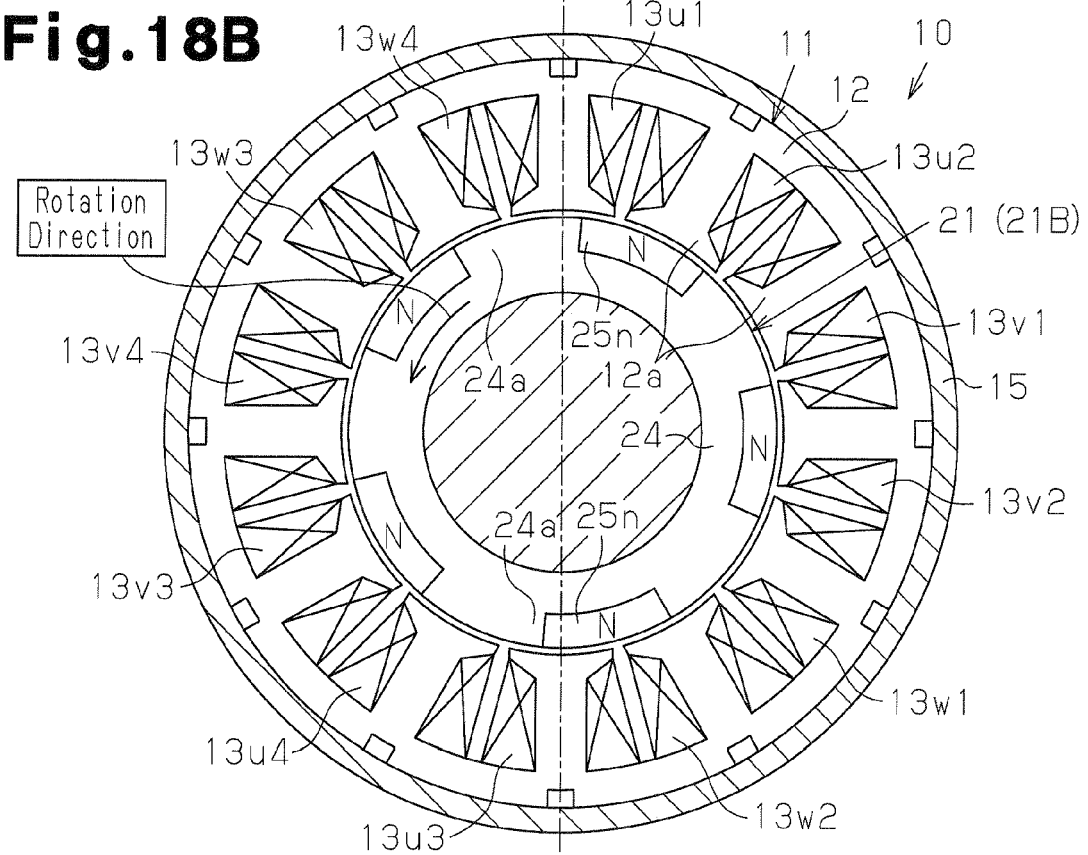
FIG. 18B is a cross-sectional view taken along a radial direction of a second unit of the brushless motor according to the fourth embodiment, and specifically, a cross-sectional view taken along line 18B-18B in FIG. 19.
Figure 19:
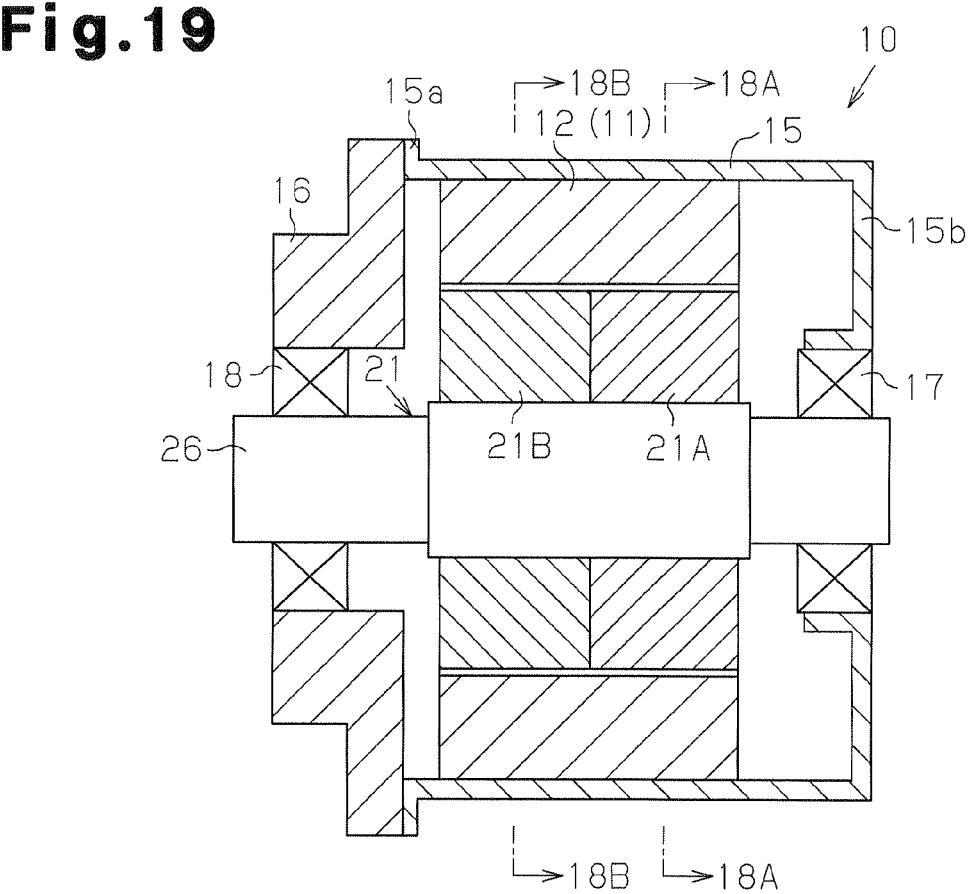
FIG. 19 is a cross-sectional view taken along an axial direction of the brushless motor according to the fourth embodiment.
Figure 20:
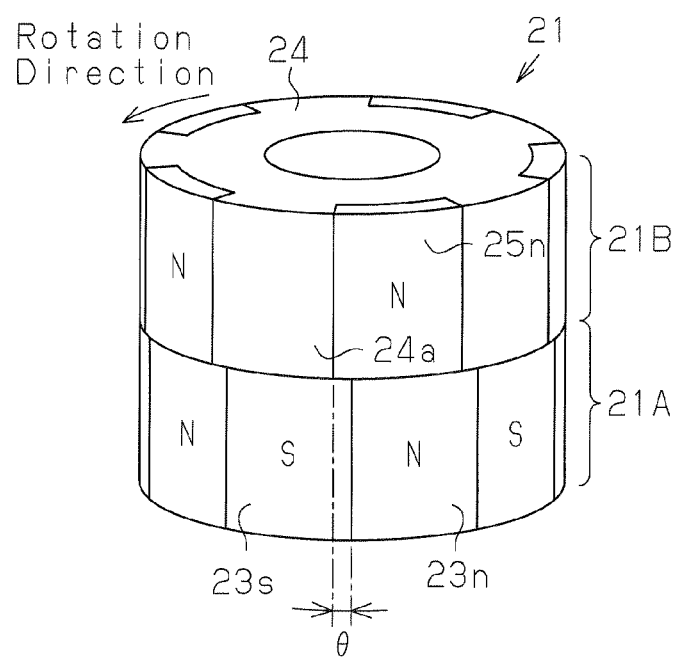
FIG. 20 is a perspective view showing a rotor of the brushless motor according to the fourth embodiment.

The motor 10 of the present embodiment is formed for applications in which the rotor 21 is rotated only in a single direction. As shown in FIGS. 18A, 18B, and 20, the present embodiment differs from the third embodiment of FIGS. 14A and 14B in that the second unit 21A is arranged to be retarded in the rotation direction by a predetermined angle (relatively shifted angle) θ relative to the first unit 21A. In other words, the N-pole magnets 25n and the salient poles 24a (specifically, the center of their magnetic poles) of the second unit 21B are respectively retarded in the rotation direction relative to the N-pole magnets (first magnets) 23n and the S-pole magnets (second magnets) 23s (specifically, the center of their magnetic poles) of the first unit 21A.

Figure 21A:
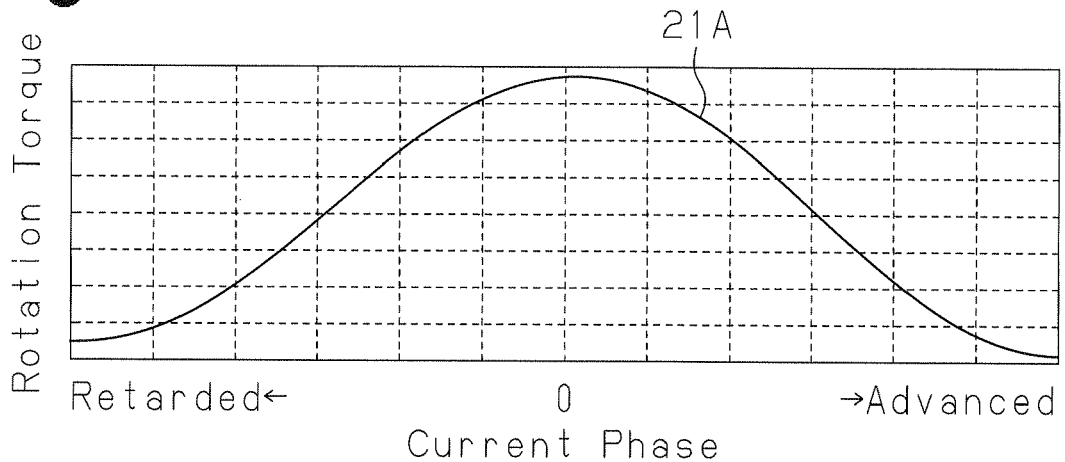
FIG. 21A is a waveform chart showing the relationship of a current phase and a rotation torque of the first unit of the brushless motor according to the fourth embodiment.
Figure 21B:
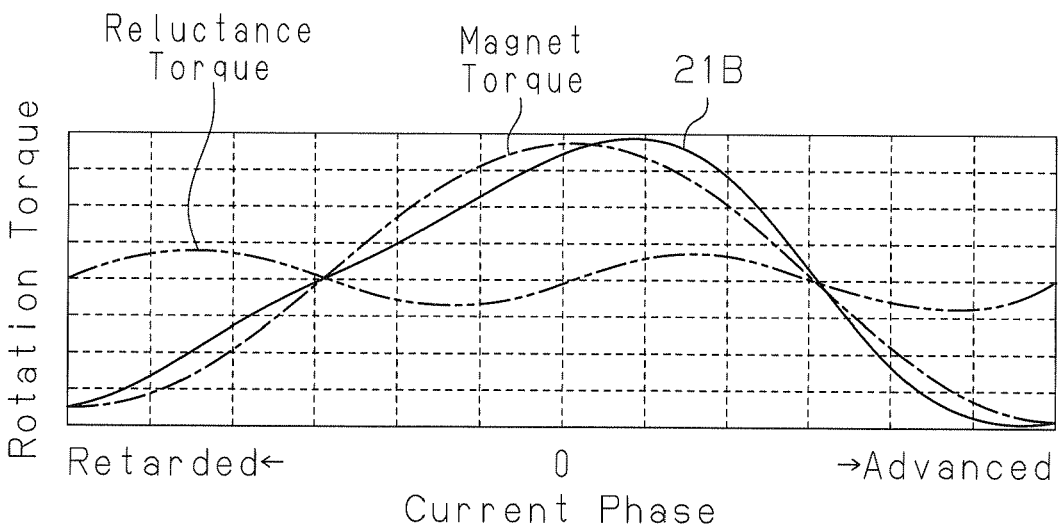
FIG. 21B is a waveform chart showing the relationship of the current phase and the rotation torque of the second unit of the brushless motor according to the fourth embodiment.
Figure 21C:
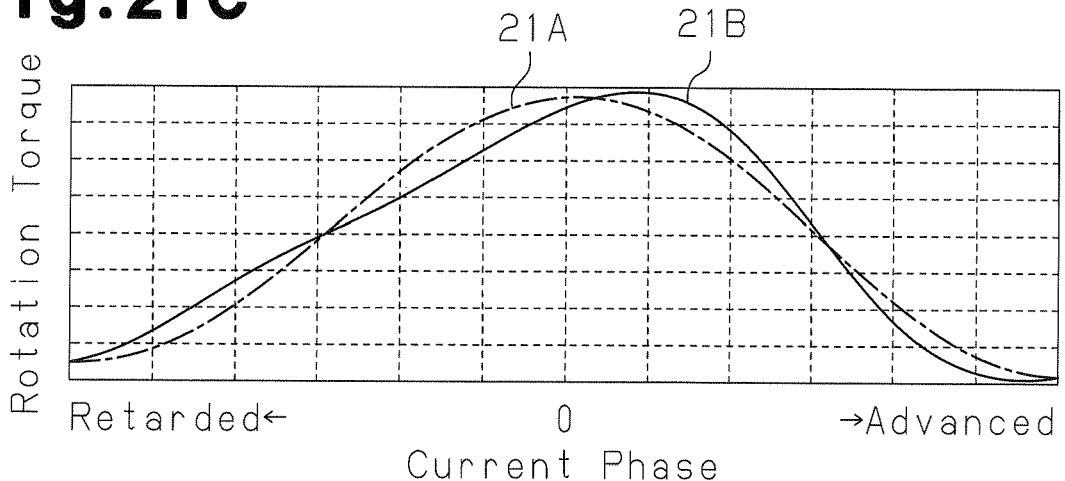
FIG. 21C is a waveform chart showing, in an overlapping manner, the waveform of FIG. 21A and the waveform of FIG. 21B of the brushless motor according to the fourth embodiment.

FIG. 21A shows the waveform of the rotation torque in the normal structure first unit 21A, and FIG. 21B shows the waveform of the rotation torque in the consequent pole second unit 21B. FIG. 21C shows, in an overlapping manner, the waveform of each rotation torque when the centers of the magnetic poles of the first and the second units 21A and 21B are in alignment, that is, when the centers of the magnetic poles of the N-pole magnets 23n (first magnets) and the N-pole magnets (third magnets) 25n are in alignment and the centers of the magnetic poles of the magnets 23s and the salient poles 24a are in alignment.

As shown in FIG. 21A, in the sole first unit 21A, a phase difference does not occur between the phase of the coil supply current and the rotation torque. In other words, the rotation torque is maximum at current phase 0°. In contrast, as shown in FIG. 21B, in the sole second unit 21B, although a phase difference does not occur between the phase of the coil supply current and the rotation torque (single-dashed line in the drawing) related to the magnets 25n, a reluctance torque (double-dashed line in the drawing) is generated in addition to magnet torque at the salient poles 24a by the effects of the magnet 25n. Thus, the rotation torque (solid line in the drawing) of the sole second unit 21B generated relative to the phase of the coil supply current consequently appears so that its maximum value is advanced in the rotation direction. That is, as shown in FIG. 21C, when the first and the second units 21A and 21B are simply arranged so that the centers of their magnetic poles are in alignment, a shift occurs in the maximum values of the rotation torques generated in the units 21A and 21B. Thus, the maximum value of the synthesized rotation torque (not shown) becomes slightly small.

Thus, taking into consideration the advancement of the rotation torque of the second unit 21B relative to the first unit 21A, the second unit 21B is arranged to be retarded in the rotation direction from the first unit 21A so that the maximum values for the rotation torques of the two units 21A and 21B are proximate to or in conformance with each other. This increases the maximum value of the synthesized rotation torque.

Figure 22:
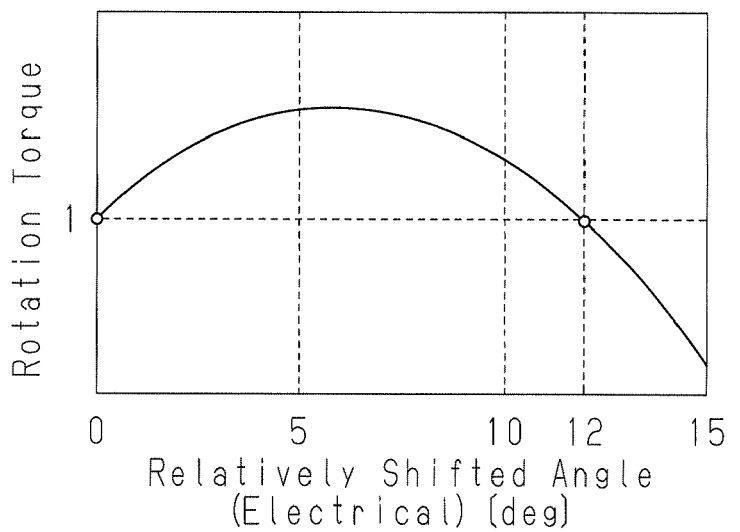
FIG. 22 is a diagram showing a preferable relatively shifted angle of the first and the second units with respect to the rotation torque of the brushless motor according to the fourth embodiment.

FIG. 22 shows the relationship of the relatively shifted angle θ (electrical angle) between the first and second units 21A and 21B and their rotation torques. As shown in FIG. 22, the synthesized rotation torque takes a maximum value when the relatively shifted angle θ is about 5° and gradually becomes smaller as the relative phase shift angle becomes farther from 5°. If the synthesized rotation torque is "1" when the phase shift angle θ is 0°, the synthesized rotation torque is greater than "1" when the relatively shifted angle θ is in the range of 0°<θ<12° and the synthesized rotation torque increases.

Figure 23:
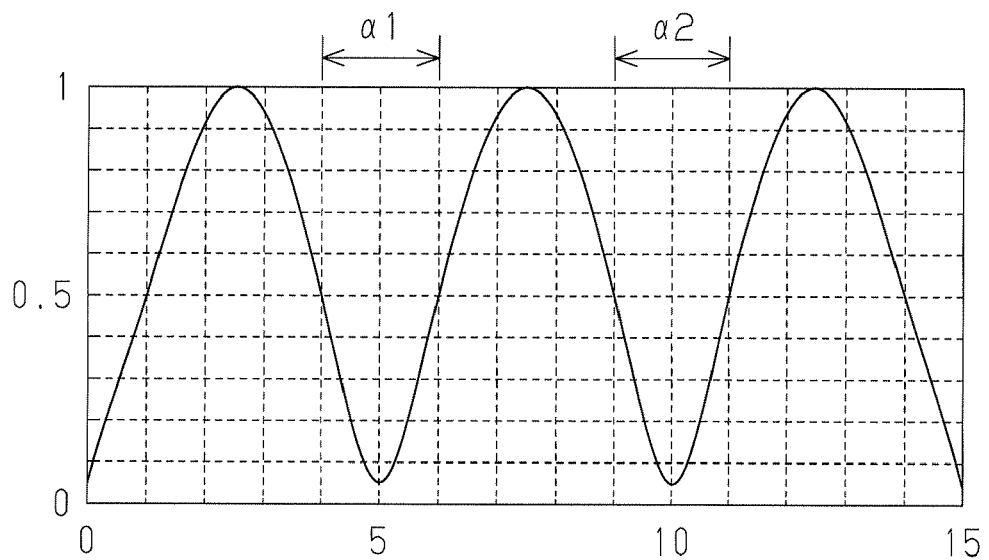
FIG. 23 is a view showing a preferable relatively shifted angle of the first and the second units with respect to the cogging torque of the brushless motor according to the fourth embodiment.
Figure 24A:
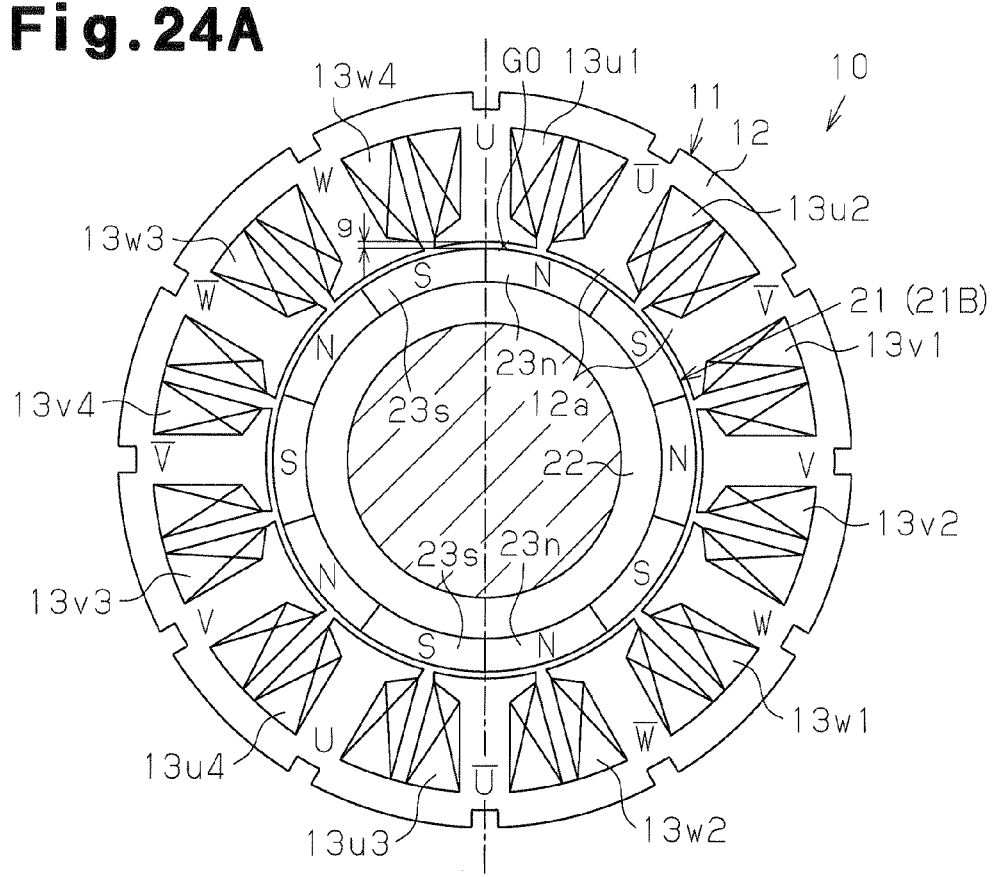
FIG. 24A is a cross-sectional view taken along a radial direction of a first unit of a brushless motor according to a fifth embodiment of the present invention.
Figure 24B:
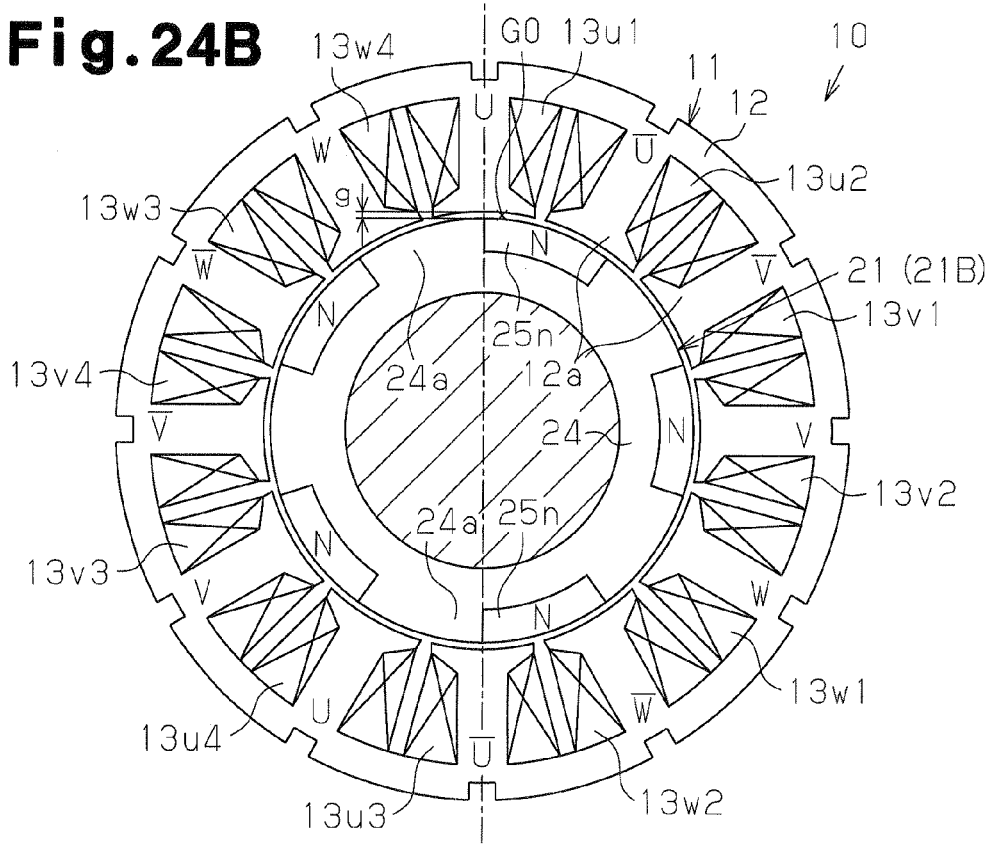
FIG. 24B is a cross-sectional view taken along a radial direction of a second unit of the brushless motor according to the fifth embodiment.
Figure 25:
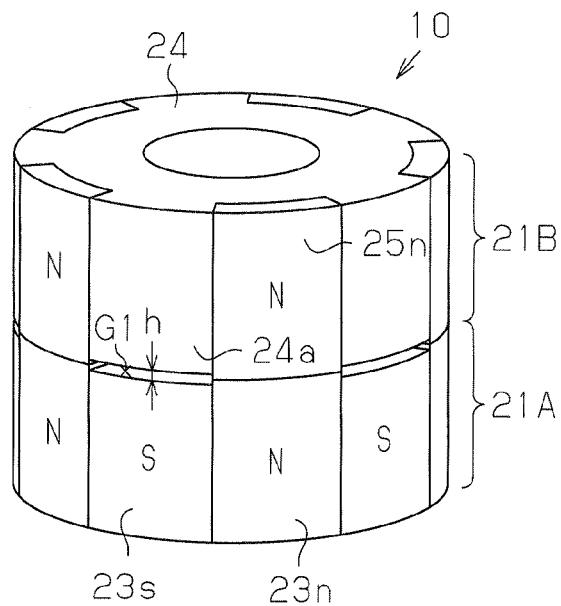
FIG. 25 is a perspective view of a rotor of the brushless motor according to the fifth embodiment.

FIG. 23 shows the relationship of the phase shift angle θ (electrical angle) and cogging torque of the first and the second units 21A and 21B. As shown in FIG. 23, the cogging torque varies along a sine-wave form so that it takes a maximum value at an angle that is a multiple of approximately 2.5° and a minimum value at an angle that is a multiple of approximately 5° with respect to the relatively shifted angle θ. It is apparent from FIGS. 22 and 23 that when the relatively shifted angle θ is in the range of 2.5°<θ<7.5°, the synthesized rotation torque is large and the cogging torque is smaller than the maximum value. Thus, this is a preferable range. Further, a range α1 in which the relatively shifted angle θ is 4° to 6° (5±1°) and a range α2 in which the relatively shifted angle θ is 9° to 11° (10±1°) are also preferable ranges in which the synthesized rotation torque is large and the cogging torque is less than or equal to about half the maximum value. In particular, since the synthesized rotation torque takes a maximum value at about 5°, when setting the relatively shifted angle θ in the range α1 of 4° to 6° (5±1°), an increase in the cogging torque is suppressed. This is further preferable.

Accordingly, the rotor 21 of the present embodiment is formed so that the relatively shifted angle θ between the first and second units 21A and 21B is set to any angle in range α1 of 4° to 6° (5±1°). This further increases the rotation torque and sufficiently suppresses the cogging torque, which may increase by the setting of the relatively shifted angle θ.

The present embodiment has the characteristic advantages described below.

(1) In the present embodiment, the second unit 21B is arranged so as to be retarded in the rotation direction relative to the first unit 21A. The shift angle θ is set to any angle in the range α1 of 5±1°. Thus, when using the motor 10 under the condition that the rotation direction is restricted, the rotation torque generated by the motor 10 is maximized while suppressing the cogging torque to about one half or less of its maximum value.

The fourth embodiment of the present invention may be modified as described below.

The shift angle θ of the first and the second units 21A, 21B may be set to any effective angle shown in FIGS. 22 and 23 within a range of, for example, 0°<θ<12°, 2.5°<θ<7.5°, and 9°<θ<11° (10±1°). When the shift angle θ is set to 0°<θ<12°, the rotation torque generated by the motor becomes large (see FIG. 22). When the shift angle θ is set within the range of 2.5°<θ<7.5°, the rotation torque generated by the motor becomes large and the cogging torque is suppressed (see FIGS. 22 and 23). When the shift angle θ is set within the range of 10±1°, the rotation torque generated by the motor becomes large and the cogging torque is suppressed (see FIGS. 22 and 23).

In the fourth embodiment, the rotor 21 is formed by the sole first unit 21A and the sole second unit 21B. However, as described in each of the above-described embodiments and there modifications, the number of at least one of the first and the second units 21A, 21B may be two or greater. In other words, in the fourth embodiment, the structures described in each of the above-described embodiments and their modifications may be employed.

A fifth embodiment according to the present invention will now be discussed with reference to FIGS. 24A to 26 centering on differences from the third embodiment.

In the rotor 21 of the present embodiment, the N-pole magnets (first magnets) 23n and the N-pole magnets (third magnets) 25n are arranged to be continuous in the axial direction. A void G1 (short-circuit magnetic flux prevention gap) serving as a magnetic spacer is formed between the S-pole magnets (second magnets) 23s and the salient poles 24a. The void G1 may be filled with resin. The void G1 has a uniform axial distance h along the circumferential direction of the magnet 23. A void G0 (air gap) is formed between the rotor 21 and the stator 11. The void G0 has a uniform radial distance g along the circumferential direction of the rotor 21. A predetermined ratio is set between the distance h of the void G1 and the distance g of the void G0.

Figure 26:
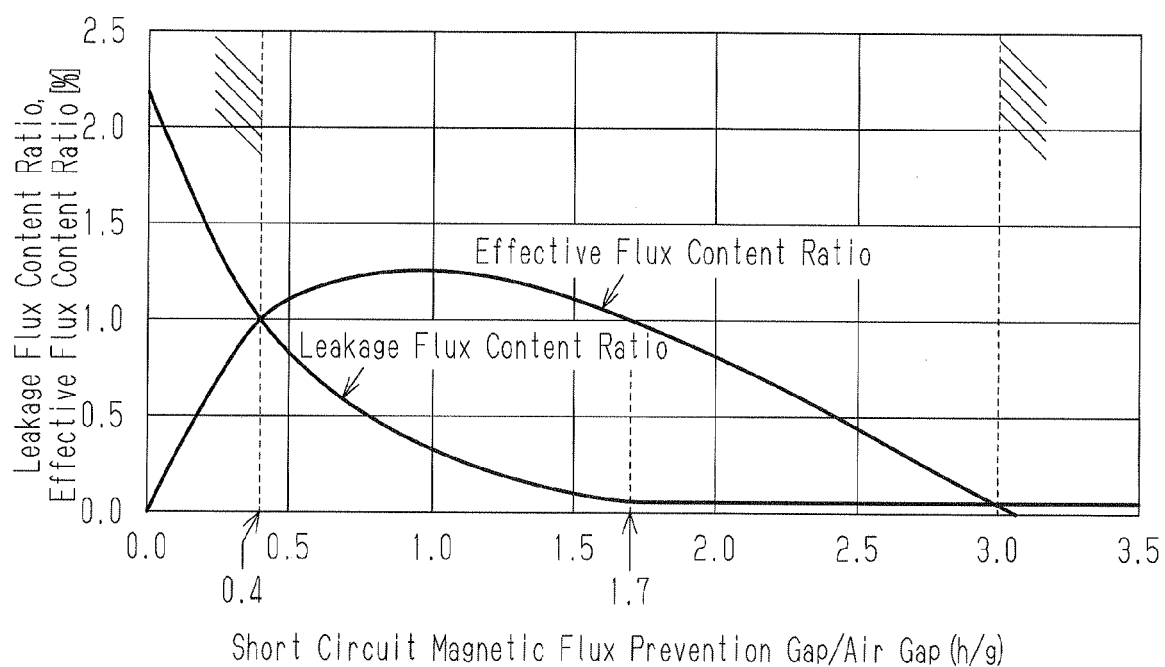
FIG. 26 is a diagram showing the advantages of the brushless motor according to the fifth embodiment.

FIG. 26 shows an effective flux content ratio and a leakage flux content ratio relative to a ratio h/g of the distance h of the void G1 and the distance g of the void G0. These measurements were taken under the condition that the axial length of the rotor 21 is uniform to prevent enlargement of the motor 10 in the axial direction. Thus, the axial length of the magnet 23s decreases as the distance h of the void G1 increases.

First, the effective flux content ratio shown in FIG. 26 will be described. In FIG. 26, the effective flux content for when the ratio h/g of the distances of the voids G1 and G0 is zero, that is, when the magnet 23s and the salient pole 24a are in contact and the void G1 does not exist, is used as a reference (e.g., 100%). As the distance h of the void G1 gradually increases and the ratio h/g of the distances increases, the effective flux content ratio also increases. When the ratio h/g of the distances becomes h/g=1.0, that is, when the distances h, g of the voids G1, G0 become equal, the effective flux content ratio that was increasing stops increasing and remains the same at a maximum value of 1.25%. Then, as the ratio h/g of the distances increases, the effective flux content ratio decreases. The content ratio becomes negative when slightly exceeding the distances ratio of h/g=3.0. Accordingly, the effective flux content ratio shifts in the positive side (increasing side) until the ratio h/g of the distances becomes 3.0, and the effective flux content exceeds 100%.

The leakage flux content ratio shown in FIG. 26 will now be described. The ideal leakage flux content is zero (0%). When the distance h of the void G1 is infinite, the leakage flux content is zero. In this state, magnetic flux flows between the magnet 23s and the stator 11. From this state, when the distance h of the void G1 gradually decreases and the ratio h/g of the distances becomes smaller, the magnets 23s become closer to the salient poles 24a and magnetic flux (leakage magnetic flux) that does not contribute to rotation flows out therebetween. This increases the leakage flux content ratio. The leakage flux content ratio is also substantially zero until the ratio h/g of the distances is 1.7. However, as the distance ratio h/g becomes smaller than 1.7, the leakage flux content ratio gradually increases, and the rate of increase also increases. The leakage flux content ratio takes a maximum value of 2.2% when the distance ratio h/g of the voids G1 and G0 is zero, that is, when the magnet 23s and the salient pole 24a are in contact and the void G1 does not exist.

The leakage flux content decreases as the distance h of the void G1 increases (as the distance ratio h/g increases). Thus, it may be considered that the effective flux content increases. However, as mentioned above, the axial length of the rotor 21 is uniform to prevent enlargement in the axial direction. Thus, as the distance h of the void G1 increases, the axial length of the magnet 23s decreases and the flux content decreases. As a result, an increase in the effective flux content is suppressed.

Therefore, in comparison to when the first and the second units 21A and 21B are joined so that the distance ratio h/g of the voids G1 and G0 becomes zero, that is, so that the magnet 23s is in contact with the salient pole 24a, it is more preferable that the first and the second units 21A and 21B be joined so that the distance ratio h/g of the voids G1 and G0 is within a range of 0<h/g≦3.0 since the effective flux content increases. When the leakage flux content ratio is taken into further consideration, the effective flux content ratio exceeds the leakage flux content ratio, and the effective flux content of the motor 10 actually increases. Thus, the range of 0.4≦h/g≦3.0 is preferable since it is a range that takes into consideration the amount of reduction (amount of cancellation) caused by the leakage flux content. The range of 0.4≦h/g≦1.7 in the above range is a further preferable range since the effective flux content ratio exceeds the leakage flux content ratio and the effective flux content ratio becomes high being 1.0% or greater with the maximum value inclusive of 1.25%.

Taking the above into consideration, in the motor 10 of the present embodiment, the distance ratio h/g of the void G1 and the void G0 is set to any value within the range of 0.4≦h/g≦1.7. Thus, in the motor 10 of the present embodiment, the effective flux content increases and a higher output may be expected.

The present embodiment has the characteristic advantages described below.

(1) In the present embodiment, the ratio h/g of the distance h of the void G1 between the salient pole 24a of the second unit 21B and the magnet 23s of the first unit 21A relative to the distance g of the void G0 between the rotor 21 and the stator 11 is set to any value within the range of 0.4≦h/g≦1.7. The effective flux content ratio thus exceeds the leakage flux content, and the effective flux content ratio becomes high and is inclusive of a maximum value. This ensures a higher output for the motor 10.

The fifth embodiment of the present invention may be modified as described below.

In the fifth embodiment, the ratio h/g of the distances of the voids G1 and G0 is set within a range of 0.4≦h/g≦1.7 but may be set to any value in a wider range of 0.4≦h/g≦3.0. Sufficient effective flux content may also be expected in such a range. The ratio h/g of the distances may be set to any value in a further wider range of 0<h/g≦3.0. The effective flux content also increases in such a range compared to when the ratio h/g of the distances is zero, that is, when the salient pole 24a of the second unit 21B and the magnet 23s of the first unit 21A are in contact.

In the fifth embodiment, a rotor having an SPM structure in which the magnets 23n, 23s, 25n are fixed to the outer surfaces of the first and the second rotor cores 22 and 24 is used. However, the fifth embodiment may be applied to a rotor having a so-called IPM structure in which magnets are inserted into the rotor core.

Figure 27A:
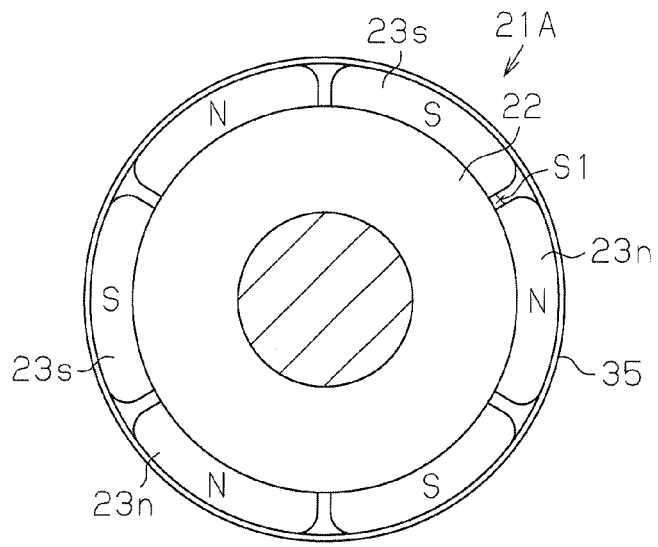
FIG. 27A is a cross-sectional view taken along a radial direction of a first unit of a brushless motor according to a sixth embodiment of the present invention.
Figure 27B:
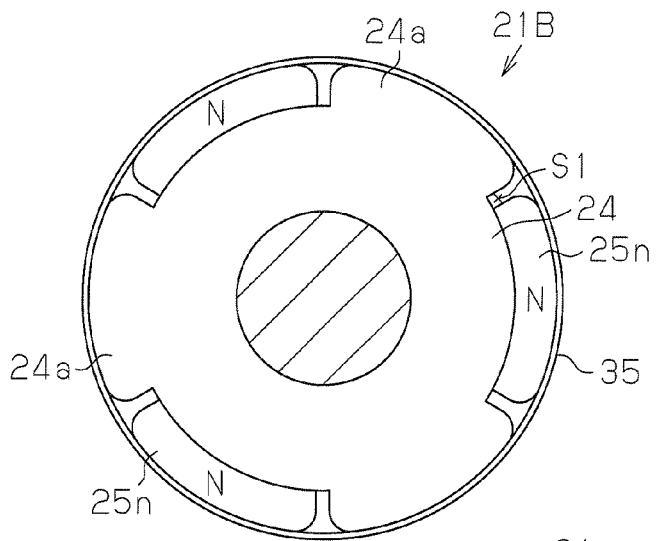
FIG. 27B is a cross-sectional view taken along a radial direction of a second unit of the brushless motor according to the sixth embodiment.
Figure 27C:
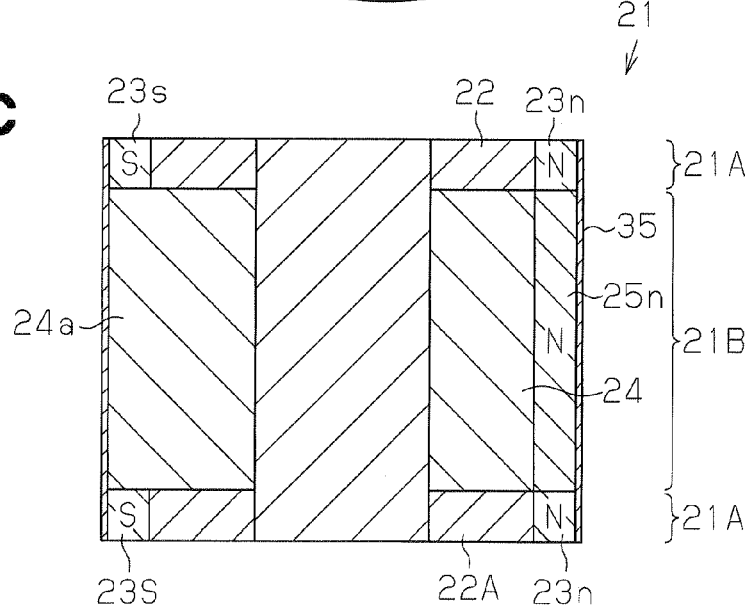
FIG. 27C is a cross-sectional view taken along an axial direction of a rotor of the brushless motor according to the sixth embodiment.

A sixth embodiment according to the present invention will be discussed with reference to FIGS. 27A to 27C centering on differences from the first embodiment.

The rotor 21 of the present embodiment is formed by first units 21A and a second unit 21B, which are joined together in the axial direction. The second unit 21B has an axial length that is about three fourth the axial length of the entire rotor 21 and is arranged at the axially central part of the rotor 21. The first units 21A are arranged on the two axial sides of the second unit 21B and each have a length that is one eighth the axial length of each rotor 21. The axial length of the rotor 21 is the same as the axial length of the stator (not shown).

The two first units 21A each includes an annular first rotor core 22 formed from a magnetic metal material. Each first rotor core 22 has a length that is about one eighth the entire axial length of the rotor 21. The first rotor cores 22 are integrally coupled to the two axial sides of a second rotor core 24 of the second unit 21B, which will be described later. A total of six magnets of the N-pole magnets (first magnets) 23n and the S-pole magnets (second magnets) 23s are fixed to the outer surface of each first rotor core 22 with there magnetic poles arranged alternately in the circumferential direction (SPM structure). The number of magnetic pole portions in the first unit 21A is "six". The magnets 23n and 23s are arcuate and have a uniform thickness over an angular range of about 60°, as viewed in the axial direction, has the same axial length as the first rotor core 22, and is arranged at equal angular intervals of 60°. A void S1 is formed between the magnets 23n and 23s.

The second unit 21B includes the second rotor core 24, which is annular and formed from a magnetic metal material. The second rotor core 24 includes three salient poles 24a positioned at equal angular intervals of 120°. The second rotor core 24 has an axial length that is about three fourth the entire axial length of the rotor 21. The first rotor cores 22 are coupled to the two axial sides of the second rotor core 24.

The salient poles 24a, which are formed integrally with the second rotor core 24, each have the same arcuate shape as the magnet 23n when viewed in the axial direction and has the same axial length as the second rotor core 24. The salient poles 24a are axially aligned (the centers of magnetic poles are aligned) with the S-pole magnets 23s of the first units 21A. The N-pole magnets (third magnets) 25n are fixed to recesses between the salient poles 24a of the second rotor core 24. Therefore, a total of three magnets 25n are arranged at equal angular intervals of 120° on the outer surface of the second rotor core 24. The magnets 25n each have the same arcuate shape as the magnets 23n and the like when viewed in the axial direction and have the same axial length as the second rotor core 24. Further, the magnets 25n are axially aligned (the centers of magnetic poles are aligned) with the magnets 23n. The magnets 25n may be formed integrally with the magnets 23n. The second unit 21B also has a total of "six" magnetic pole portions, in which the number of magnetic pole portions of the N-pole magnet 25n is "three", and the number of magnetic pole portions of the salient pole 24a (so-called consequent pole) that functions as the S-pole is "three". The void S1 is also formed between the salient pole 24a and the magnet 25n in the same manner as the first unit 21A.

A cylindrical cover member 35 is fitted onto the first and second units 21A and 21B to continue over both of the units 21A and 21B. The cover member 35 is formed from a non-magnetic metal plate such as stainless steel (SUS) or a copper alloy that does not interfere with the magnetic fields of the magnets 23n, 23s, and 25n. The cover member 35 is arranged to prevent the magnets 23n, 23s, and 25n from falling out of the fixing surfaces of the first and second rotor cores 22 and 24 and prevent fragments from scattering when the magnets 23n, 23s, and 23n are fragmented. The thickness of the cover member 35 is set to about 20 to 30% of the width of the void between the rotor 21 and the stator.

In the first units 21A, which have a normal structure, the magnets 23n and 23s have a large amount of magnetic flux in the radial direction. In other words, the first units 21A have a large amount of effective magnetic flux that mutually act with the stator and contribute to rotation. In the second unit 21B, which has a consequent pole structure, the magnet 25n has a large amount of magnetic flux in the radial direction. Therefore, the magnet 25n of the second unit 21B has a large amount of effective magnetic flux that acts with the stator and contributes to rotation. In contrast, the salient poles 24a of the second unit 21B has slightly weaker magnetic field. This reduces the flux content of the effective magnetic flux in the radial direction and leakage magnetic flux that leaks in the axial direction is easily generated. Thus, when the second unit 21B is arranged at the two axial sides of the rotor 21 at which leakage magnetic flux that leaks in the axial direction is easily generated, the leakage flux content at the salient poles 24a increases.

Taking this into consideration, the normal structure first units 21A, which include the magnets 23n and 23s for the two magnetic poles, are arranged at the two axial sides of the rotor 21 in the present embodiment. This reduces the leakage magnetic flux that leaks in the axial direction at the two axial sides of the rotor 21.

The present embodiment has the characteristic advantages described below.

(1) The rotor 21 of the present embodiment includes the first units 21A, which have the normal SPM structure, and the second unit 21B, which have the consequent pole structure. The magnets 23n, 23s, and 25n fixed to the outer surfaces of the first and the second rotor cores 22 and 24 are covered by the cover member 35, which prevents scattering. The leakage magnetic flux that leaks in the axial direction is reduced by arranging the first units 21A on the two axial sides of the second unit 21B. This increases the effective magnetic flux and the motor has a higher output.

(2) In the present embodiment, the cover member 35 is formed from a cylindrical non-magnetic metal plate so as to be fitted to the first and the second units 21A and 21B. This facilitates formation of the cover member 35 and attachment of the cover member 35 to the rotor 21. In the present embodiment, the cover member 35 continues to cover the units 21A and 21B. Thus, the number of parts is reduced.

(3) In the present embodiment, the axially aligned magnets 23n and 25n are formed to have the same shape when viewed in the axial direction. Therefore, formation of the magnets 23n and 25n to be continuous between the units 21A and 21B reduces the number of parts.

Figure 28A:
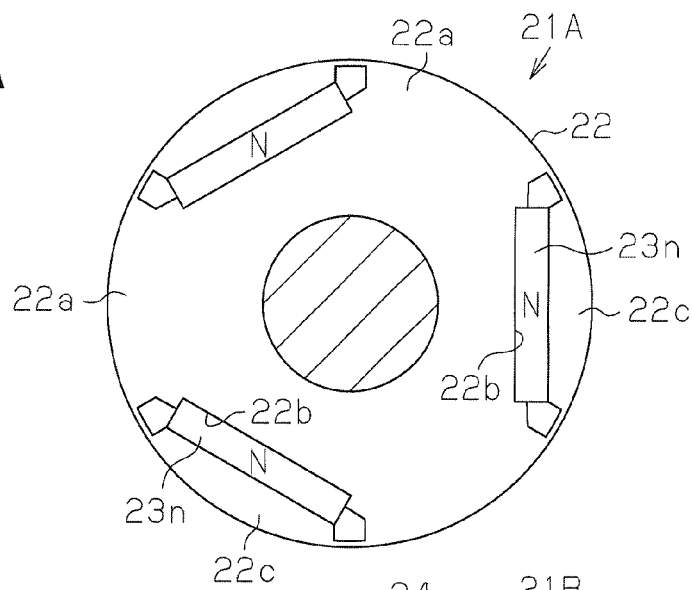
FIG. 28A is a cross-sectional view taken along a radial direction of a first unit of a brushless motor according to a seventh embodiment of the present invention.
Figure 28B:
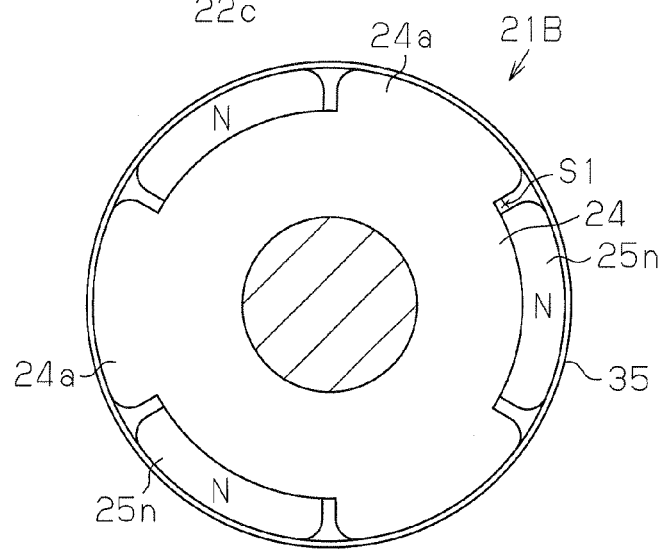
FIG. 28B is a cross-sectional view taken along a radial direction of a second unit of the brushless motor according to the seventh embodiment.
Figure 28C:
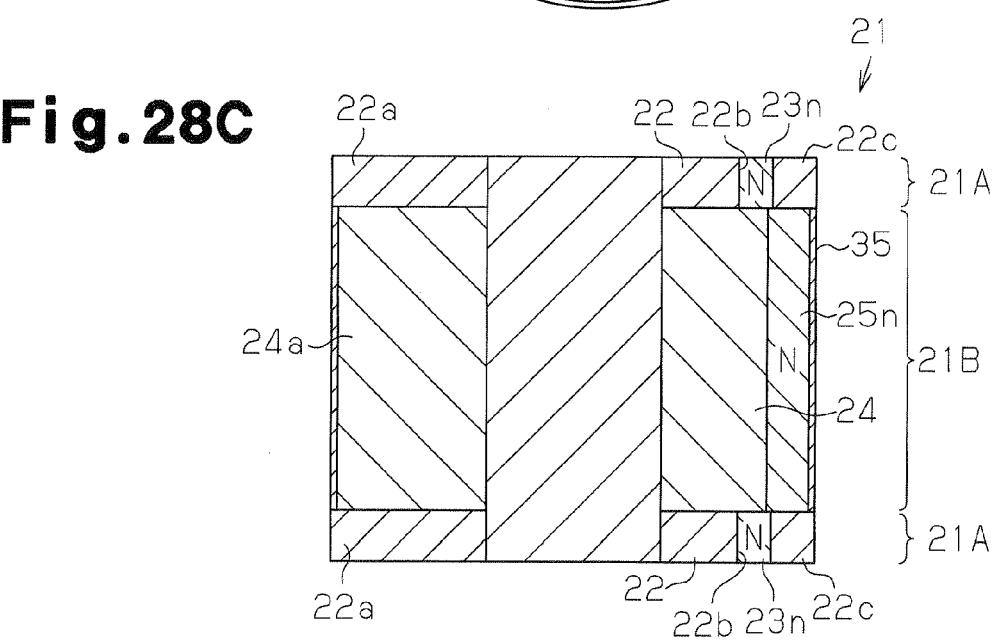
FIG. 28C is a cross-sectional view taken along an axial direction of a rotor of the brushless motor according to the seventh embodiment.

A seventh embodiment according to the present invention will now be discussed with reference to FIGS. 28A to 28C centering on differences from the sixth embodiment.

The first units 21A of the rotor 21 in the present embodiment have an IPM structure (Interior Permanent Magnet structure) instead of the normal structure (SPM structure).

The first rotor core 22 of the first unit 21A includes three receptacles 22n, which are linear, orthogonal to the radial direction, and arranged at equal angular intervals of 120°. The N-pole magnets 23n, which are shaped as rectangular plates, are inserted into and fixed to the receptacles 22b. The portions of the first rotor core 22 located radially outward from the receptacles 22b define magnet side magnetic pole portions 22c that function as N-poles in cooperation with the magnets 23n. The magnet side magnetic pole portions 22c are arranged at an equal angular interval of 120° and are each formed over an angular range of about 60°.

Portions of the first rotor core 22 between the magnet side magnetic pole portions 22c define core magnetic pole portions 22a that function as S-poles. The core magnetic pole portions 22a are arranged at an equal angular interval of 120° and are each formed over an angular range of about 60°. Each receptacle 22b is formed to be longer at the two longitudinal sides than the magnets 23n so as to extend from the two sides of the magnet side magnetic pole portion 22c to near the rim of the first rotor core 22. Therefore, each receptacle 22b magnetically separates the core magnetic pole portion 22a and the magnet side magnetic pole portion 22c in the circumferential direction. The first unit 21A has a consequent pole structure having a total of "six" magnetic poles, which include the "three" magnetic poles of the core magnetic pole portion 22a and the "three" magnetic poles of the magnet side magnetic pole portion 22c.

Further, the cover member 35 is not necessary for the first units 21A of the IPM structure. Therefore, in the rotor 21 of the present embodiment, the cover member 35 is shortened in accordance with the axial length of the second unit 21B and fitted to only the second unit 21B. The first units 21A that do not require the cover member 35 is enlarged outward in the radial direction by an amount corresponding to the thickness of the cover member 35 so that the outer surfaces of the first units 21A are flush with the outer surface of the cover member 35, which is attached to the second unit 21B. The cover member 35 is attached to the second unit 21B before the first units 21A are coupled to the second unit 21B.

In this manner, the two IPM structure first units 21A having an enlarged outer diameter are arranged at the two axial sides of the rotor 21 at which leakage magnetic flux that leaks in the axial direction is easily generated. Accordingly, the magnetically spaced distance from the stator at the two axial sides of the rotor 21 becomes small, and the leakage magnetic flux that leaks in the axial direction is reduced. This increases the effective magnetic flux and contributes to a higher output for the motor.

The present embodiment has the characteristic advantages described below.

(1) The rotor 21 of the present embodiment includes the IPM structure first units 21A, in which the magnets 23n are inserted into the first rotor core 22, and the consequent pole second unit 21B, which is similar to that of the sixth embodiment. The magnets 25n fixed to the outer surface of the second rotor core 24 are covered by the cover member 35 and prevented from being scattered. Further, the two first units 21A are arranged at the two axial sides of the second unit 21B. Moreover, the outer diameters of the first units 21A are enlarged to be the same as the outer diameter of the cover member 35 arranged on the second unit 21B. The magnetically spaced distance from the stator at the two axial sides of the rotor 21 becomes small, and the leakage magnetic flux that leaks in the axial direction is reduced. This increases the effective magnetic flux and the motor has a higher output.

(2) In the present embodiment, the cover member 35 is formed by a cylindrical non-magnetic metal plate that is fitted to the second unit 21B. This facilitates formation of the cover member 35 and attachment to the rotor 21.

Figure 29A:
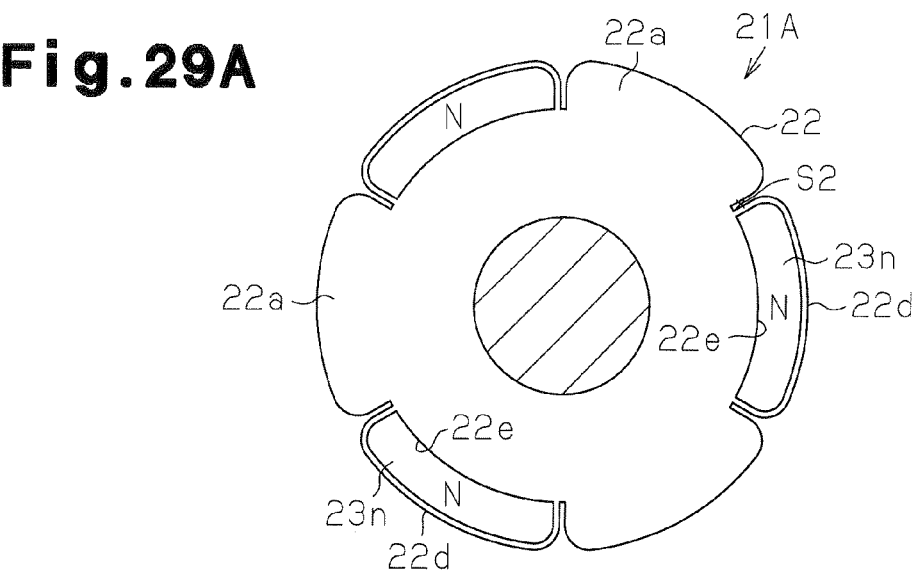
FIG. 29A is a cross-sectional view taken along a radial direction of a first unit of a brushless motor according to an eighth embodiment of the present invention.
Figure 29B:
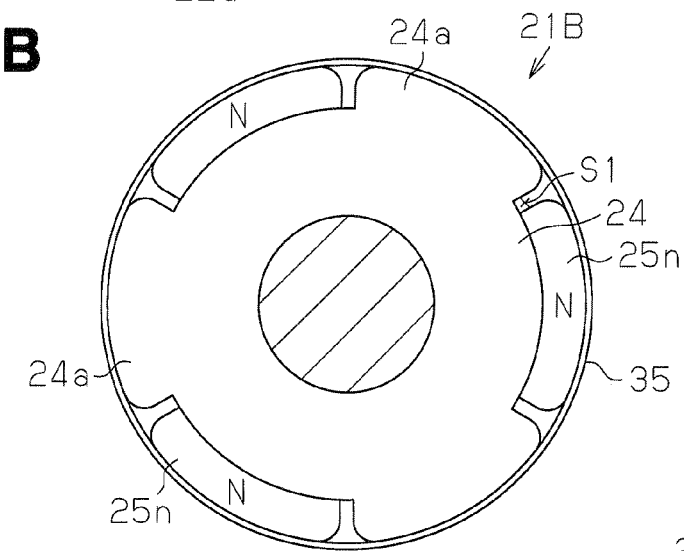
FIG. 29B is a cross-sectional view taken along a radial direction of a second unit of the brushless motor according to the eighth embodiment.
Figure 29C:
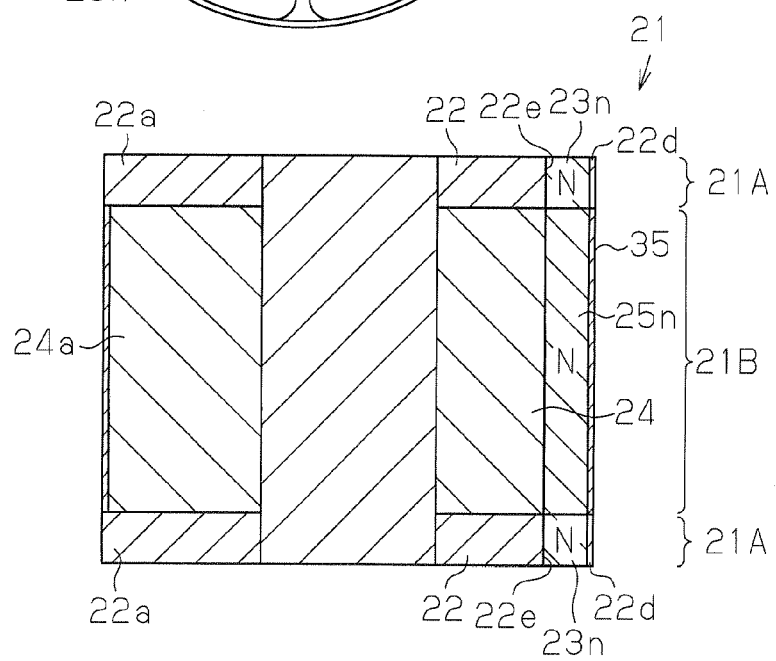
FIG. 29C is a cross-sectional view taken along an axial direction of a rotor of the brushless motor according to the eighth embodiment.

An eighth embodiment according to the present invention will now be discussed with reference to FIGS. 29A to 29C centering on differences from the seventh embodiment.

The rotor 21 of the present embodiment includes first units 21A having a structure that differs from the IPM structure (Interior Permanent Magnet structure).

The first unit 21A includes three N-pole magnets 23n. Each magnet 23n has the same shape as the magnets 25n of the second unit 21B when viewed in the axial direction. The magnets 23n may be formed integrally with the magnets 25n. The first rotor core 22 includes three frame-shaped portions 22d shaped in conformance with the outer shape of the magnets 23n. The frame-shaped portions 22d are arranged at equal angular intervals of 120°. Receptacles 22e are formed between the frame-shaped portions 22d and the first rotor core 22. The magnets 23n are inserted into and fixed to the receptacles 22e.

The salient poles 22a functioning as the S-poles are formed at equal angular intervals of 120° between the magnets 23n. Each salient pole 22a has the same shape as the shape of the joined magnet 23n and frame-shaped portion 22d when viewed in the axial direction. Each salient pole 22a is enlarged outward in the radial direction more than the salient pole 24a of the second unit 21B by an amount corresponding to the thickness of the cover member 35. In other words, the first unit 21A of the present embodiment does not require the cover member 35 in the same manner as the first units 21A of the seventh embodiment. Therefore, the cover member 35 is fitted only to the second unit 21B, and the first units 21A are enlarged outward in the radial direction by the thickness of the cover member 35. In other words, the outer surfaces of the frame-shaped portions 22d of the first units 21A and the outer surfaces of the salient poles 22a are flush with the outer surface of the cover member 35 attached to the second unit 21B. A void S2, which is slightly narrower than the void S1 of the second unit 21B in the circumferential direction, is formed between the salient pole 22a and the frame-shaped portion 22d. The first unit 21A has a consequent pole structure having a total of "six" magnetic poles portions, which include "three" salient poles 22a serving as magnetic pole portions and "three" magnets 23n serving as magnetic pole portions.

In the present embodiment, the two IPM structure first units 21A having an enlarged outer diameter are arranged at the two axial sides of the rotor 21 at which leakage magnetic flux that leaks in the axial direction is easily generated. This decreases the magnetically spaced distance from the stator at the two axial sides of the rotor 21 and reduces the leakage magnetic flux that leaks in the axial direction. Thus, the effective magnetic flux increases and contributes to higher output for the motor.

The present embodiment has the characteristic advantages described below.

(1) The eighth embodiment has advantages (1) and (2) of the seventh embodiment and advantage (3) of the sixth embodiment.

The sixth to eighth embodiments may be modified as described below.

The cover member 35 may be changed so that it is formed from a resin material to have a predetermined shape for attachment or so that it is formed integrally with the rotor from a resin material.

In the sixth embodiment, the cover member 35 is formed continuously over both of the first and second units 21A and 21B, but may be divided into members corresponding to the first units 21A and a member corresponding to the second unit 21B.

In the seventh embodiment, the first units 21A are formed with the IPM structure and with the consequent pole structure that uses the unipolar magnets 23n but may be an IPM structure that uses bipolar magnets.

In each of the embodiments described above, when the magnets of the same pole (e.g., 23n and 25n or 23s and 25s) are axially aligned in the axially adjacent units, the magnets of the same pole may be replaced by a single magnet. This reduces the number of parts of the rotor 21.

In each of the embodiments described above, each of the first and second rotor cores 22 and 24 may be, for example, molded from magnetic fine particles.

In each of the embodiments described above, the stator 11 has "twelve" magnetic pole portions, and the rotor 21 has "ten" magnetic pole portions. However, the number of magnetic pole portions of the stator 11 and the number of magnetic pole portions of the rotor 21 may be varied as required. For instance, each of the embodiments described above may be applied in the same manner to a brushless motor including a rotor 21 with "fourteen" magnetic pole portions. Further, each of the above embodiments may be applied in the same manner to a brushless motor including a stator 11 with "12n (n being a natural number)" magnetic pole portions, and the rotor 21 with "10n" or "14n" magnetic pole portions.

Each of the embodiments described above may be applied in the same manner to other motors that use magnets such as an outer rotor type brushless motor in which the rotor is arranged outside the stator or a DC motor incorporating a brush and having a structure including magnets in the stator side and supplying power to the rotor (armature) with a power supply brush.

Figure 30:
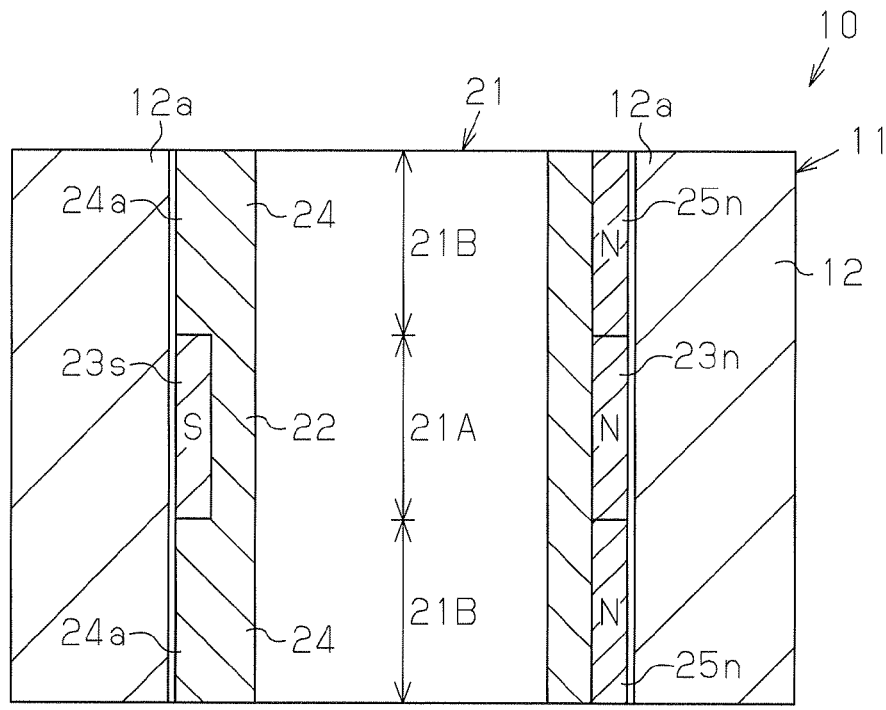
FIGS. 30 and 31 are cross-sectional views taken along an axial direction of a brushless motor according to another example.
Figure 31:
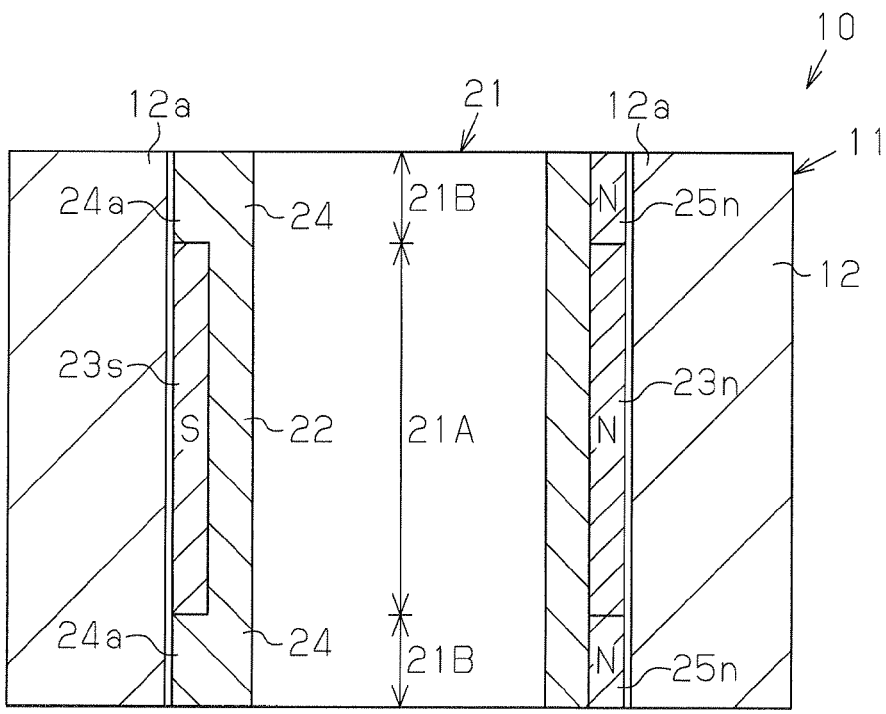

In each of the embodiments described above, the ratio of the axial length of the first unit 21A and the second unit 21B may be varied when necessary. For instance, in the rotor including the single first unit 21A and the two second units, the ratio of each first unit 21A and each second unit may be 1:1, as shown in FIG. 30, or the ratio of each first unit 21A and each second unit may be 2:1, as shown in FIG. 31.

What is claimed is:

1. A motor comprising:
    a stator including a stator core having a plurality of teeth and a coil wound around the teeth; and
    a rotor including a rotor core and a plurality of magnets fixed to the rotor core, the rotor including:
        a first unit including a first magnet for an N-pole and a second magnet for an S-pole, the first and second magnets being alternately arranged along a circumferential direction of the rotor at equal angular intervals to form a plurality of magnetic pole portions; and
        a second unit including a third magnet of an N-pole or S-pole and a salient pole arranged in the rotor core, the salient pole functioning as a magnetic pole differing from the third magnet, the third magnet and the salient pole being alternately arranged along the circumferential direction of the rotor to form a plurality of magnetic pole portions, and the number of magnetic pole portions of the second unit being the same as the number of magnetic pole portions of the first unit;
    wherein the third magnet and the magnet of the first unit having the same pole as the third magnet are aligned in an axial direction of the rotor.

2. The motor according to claim 1, wherein in the first unit, a gradient k1 [T/deg] of change in magnetic flux density at a boundary of the magnetic pole portions that are adjacent to each other in the circumferential direction is set within a range of $0.0648 \leq k1 \leq 0.0728$; and
    in the second unit, a gradient k2 [T/deg] of change in magnetic flux density at a boundary of the magnetic pole portions that are adjacent to each other in the circumferential direction is set within a range of $0.0711 \leq k2 \leq 0.0728$.

3. The motor according to claim 1, wherein the second unit includes two second units, and the two second units are arranged at two axial sides of the first unit.

4. The motor according to claim 1, wherein the second unit includes two second units, the third magnet of one of the second units is an N-pole and the third magnet of the other one of the second units is an S-pole.

5. The motor according to claim 1, wherein the coil includes coils for three phases;
    the stator includes 12n (n being a natural number) magnetic pole portions; and
    the rotor includes 10n or 14n magnetic pole portions.

6. The motor according to claim 1, wherein the third magnet and the magnet of the first unit having the same pole as the third magnet are formed integrally with each other.

7. The motor according to claim 1, wherein the third magnet and the magnet of the first unit having the same pole as the third magnet are formed independently from each other.

8. The motor according to claim 7, wherein a spacer formed between the first and second units magnetically separates the two units.

9. The motor according to claim 1, further comprising:
    a cylindrical housing including an open portion defined in at least one of its two axial sides, the housing including an inner surface to which the stator core is fixed; and
    an end frame which closes the open portion;
    wherein the second unit is arranged toward the open portion on the first unit in the axial direction of the housing.

10. The motor according to claim 9, wherein the housing includes the open portion only at one of the two ends and a bottom portion at the other one of the two ends; and
    the sole first unit and the sole second unit are axially aligned with each other.

11. The motor according to claim 9, wherein the housing includes the open portion at each of the two ends, with each open portion being closed by the end frame; and
    the second unit includes two second units, with the two second units being respectively arranged at two axial sides of the first unit.

12. The motor according to claim 1, wherein the second unit is arranged retarded in a rotation direction of the rotor from the first unit.

13. The motor according to claim 12, wherein the rotor includes ten magnetic pole portions;
    the stator includes twelve magnetic pole portions; and
    a relatively shifted angle θ of the first and second units is set within a range of $0° < θ < 12°$.

14. The motor according to claim 13, wherein the relatively shifted angle θ of the first and second units is set within a range of $2.5° < θ < 7.5°$.

15. The motor according to claim 13, wherein the relatively shifted angle θ of the first and second units is set within a range of $5 \pm 1°$ or $10 \pm 1°$.

16. The motor according to claim 15, wherein the relatively shifted angle θ of the first and the second units is set within a range of $5 \pm 1°$.

17. The motor according to claim 1, wherein a void having distance g is formed between the rotor and the stator;
    a magnetic spacer having distance h is formed between the salient pole and the magnet of the first unit, which is axially aligned with the salient pole; and
    a ratio h/g of the distances is set within a range of $0 < h/g \leq 3.0$.

18. The motor according to claim 17, wherein the ratio h/g of the distances is set within a range of $0.4 \leq h/g \leq 3.0$.

19. The motor according to claim 18, wherein the ratio h/g of the distances is set within a range of $0.4 \leq h/g \leq 1.7$.

20. The motor according to claim 1, further comprising:
a cover member which covers at least the first to third magnets;
wherein a void is formed between the third magnet and the salient pole in the second unit; and
the first unit includes two first units, with the two first units being respectively arranged at two axial sides of the second unit.

21. The motor according to claim 20, wherein the cover member is cylindrical, formed from a non-magnetic metal plate, and is fitted onto the first or second units including the magnets that are to be covered.

22. The motor according to claim 1, further comprising:
a cover member which covers at least the third magnet;
wherein the first unit is formed by alternately inserting the first and second magnets into the rotor core in the circumferential direction or by inserting at least one of the first and second magnets into the rotor core and arranging a core magnetic pole portion in the rotor core in lieu of the other one of the magnet;
a void is formed between the third magnet and the salient pole in the second unit; and
the first unit includes two first units, with the two first units being respectively arranged at two axial sides of the second unit, and the first unit being formed so that its outer diameter is in conformance with the outer diameter of the cover member.

23. The motor according to claim 22, wherein the cover member is cylindrical, formed from a non-magnetic metal plate, and is fitted onto the first or second units including the magnets that are to be covered.

24. The motor according to claim 1, wherein the magnets of the first and second units aligned in the axial direction of the rotor have the same shape when viewed in the axial direction.

25. A rotor comprising:
a rotor core; and
a plurality of magnets fixed to the rotor core; the rotor including:
a first unit including a first magnet for an N-pole and a second magnet for an S-pole, the first and second magnets being alternately arranged along a circumferential direction of the rotor at equal angular intervals to form a plurality of magnetic pole portions; and
a second unit including a third magnet of an N-pole or S-pole and a salient pole arranged in the rotor core, the salient pole functioning as a magnetic pole differing from the third magnet, the third magnet and the salient pole being alternately arranged along the circumferential direction of the rotor to form a plurality of magnetic pole portions, and the number of magnetic pole portions of the second unit being the same as the number of magnetic pole portions of the first unit;
wherein the third magnet and the magnet of the first unit having the same pole as the third magnet are aligned in an axial direction of the rotor.

* * * * *